US012598564B2

(12) United States Patent
Zhang et al.

(10) Patent No.: US 12,598,564 B2
(45) Date of Patent: Apr. 7, 2026

(54) MULTIPLEXING AND PRIORITIZATION TECHNIQUES FOR UPLINK SIGNALING AND NON-SERVING CELL SYNCHRONIZATION SIGNALS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 638 days.

(21) Appl. No.: 17/878,731

(22) Filed: Aug. 1, 2022

(65) Prior Publication Data

US 2024/0040522 A1 Feb. 1, 2024

(51) Int. Cl.
*H04W 56/00* (2009.01)
*H04W 72/1268* (2023.01)
*H04W 72/566* (2023.01)

(52) U.S. Cl.
CPC ..... *H04W 56/001* (2013.01); *H04W 72/1268* (2013.01); *H04W 72/569* (2023.01)

(58) Field of Classification Search
CPC ........... H04W 74/0833; H04W 74/006; H04W 56/00; H04W 56/0015; H04W 68/02; H04L 1/1812; H04L 5/00
See application file for complete search history.

(56) References Cited

U.S. PATENT DOCUMENTS

| | | | |
|---|---|---|---|
| 2019/0222286 A1* | 7/2019 | Miao | H04L 5/0048 |
| 2022/0029764 A1* | 1/2022 | Liou | H04L 5/0094 |
| 2022/0232655 A1 | 7/2022 | Noh et al. | |
| 2024/0407046 A1* | 12/2024 | Lee | H04W 64/00 |

FOREIGN PATENT DOCUMENTS

WO WO-2020163368 A1 8/2020

OTHER PUBLICATIONS

International Search Report and Written Opinion—PCT/US2023/023676—ISA/EPO—Sep. 15, 2023.

* cited by examiner

*Primary Examiner* — Iqbal Zaidi
(74) *Attorney, Agent, or Firm* — Holland & Hart LLP/Qualcomm

(57) ABSTRACT

This disclosure provides systems, methods and apparatus, including computer programs encoded on computer storage media, for multiplexing and prioritization techniques for uplink signaling and non-serving cell synchronization signals. In some aspects, a user equipment (UE) and a network entity may support a prioritization rule according to which the UE and the network entity may enable uplink multiplexing with a set of non-serving cell synchronization signal blocks (SSBs). For example, an uplink signal and a set of non-serving cell SSBs may be scheduled for the UE and may at least partially overlap in time and the UE may prioritize one of the uplink signal or the set of non-serving cell SSBs in accordance with the prioritization rule. The prioritization rule may be associated with a scheduling offset of the uplink signal or may be associated with whether the set of non-serving cell SSBs are indicated for measurement at the UE.

19 Claims, 10 Drawing Sheets

130

105

115

Network Entity

Transceiver

810

Antenna

815

Communications Manager

820

Memory

Code

830

825

Processor

835

840

805

800

Receive control signaling that indicates a first set of resources associated with an uplink signal and a second set of resources associated with an SSB that corresponds to a non-serving cell, wherein the first set of resources at least partially overlaps in time with the second set of resources

905

Communicate with a network entity in accordance with a prioritization of one of the uplink signal or the SSB

910

Figure 10:
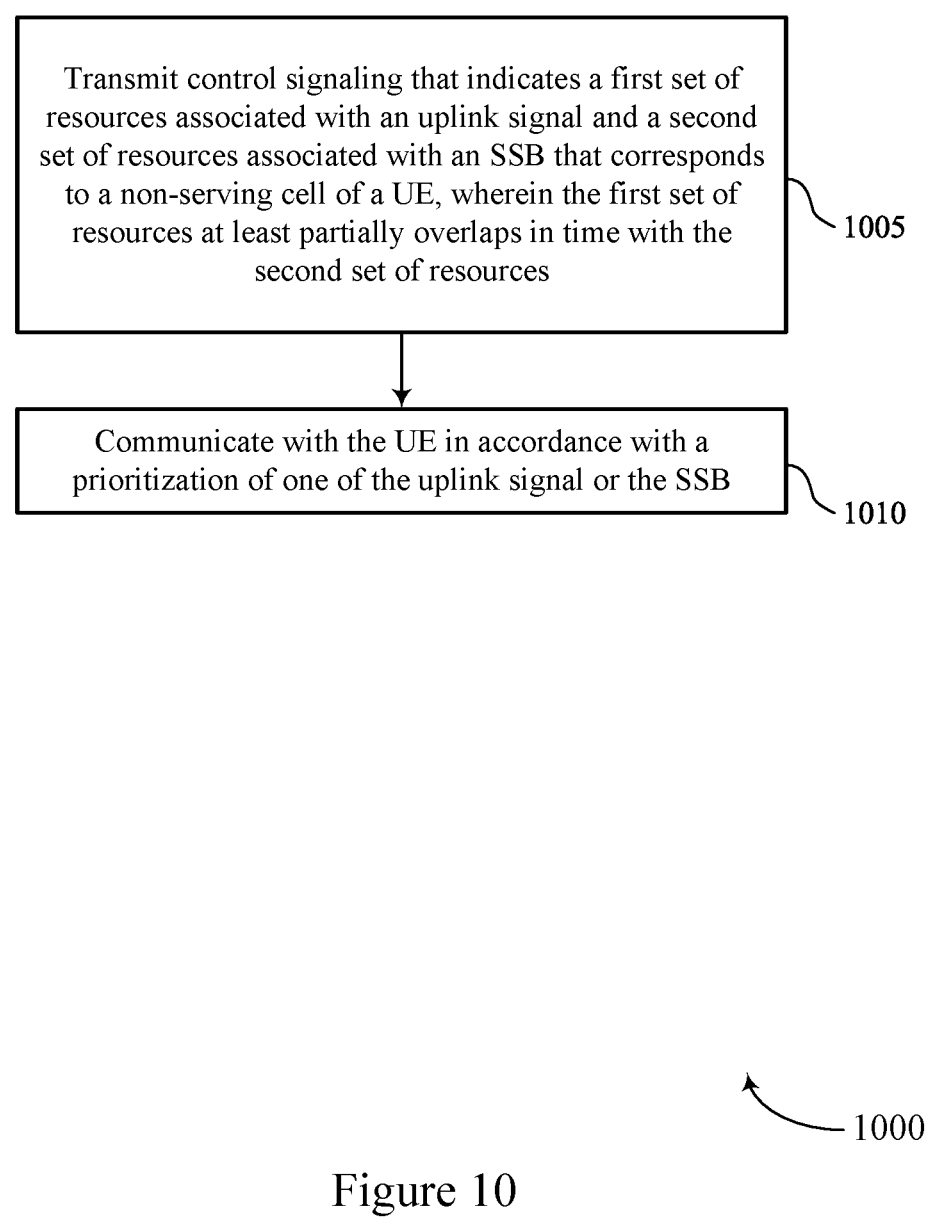

Transmit control signaling that indicates a first set of resources associated with an uplink signal and a second set of resources associated with an SSB that corresponds to a non-serving cell of a UE, wherein the first set of resources at least partially overlaps in time with the second set of resources

1005

Communicate with the UE in accordance with a prioritization of one of the uplink signal or the SSB

MULTIPLEXING AND PRIORITIZATION TECHNIQUES FOR UPLINK SIGNALING AND NON-SERVING CELL SYNCHRONIZATION SIGNALS

TECHNICAL FIELD

This disclosure relates to wireless communications, including multiplexing and prioritization techniques for uplink signaling and non-serving cell synchronization signals.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving control signaling that indicates a first set of resources associated with an uplink signal and a second set of resources associated with a synchronization signal block (SSB) that corresponds to a non-serving cell, where the first set of resources at least partially overlaps in time with the second set of resources, and communicating with a network entity in accordance with a prioritization of one of the uplink signal or the SSB.

Another innovative aspect of the subject matter described in this disclosure can be implemented in an apparatus for wireless communications at a UE. The apparatus may include one or more interfaces and a processing system. The one or more interfaces may be configured to obtain control signaling that indicates a first set of resources associated with an uplink signal and a second set of resources associated with an SSB that corresponds to a non-serving cell, where the first set of resources at least partially overlaps in time with the second set of resources, and communicate with a network entity in accordance with a prioritization of one of the uplink signal or the SSB.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive control signaling that indicates a first set of resources associated with an uplink signal and a second set of resources associated with an SSB that corresponds to a non-serving cell, where the first set of resources at least partially overlaps in time with the second set of resources, and communicate with a network entity in accordance with a prioritization of one of the uplink signal or the SSB.

Another innovative aspect of the subject matter described in this disclosure can be implemented in another apparatus for wireless communications at a UE. The apparatus may include means for receiving control signaling that indicates a first set of resources associated with an uplink signal and a second set of resources associated with an SSB that corresponds to a non-serving cell, where the first set of resources at least partially overlaps in time with the second set of resources, and means for communicating with a network entity in accordance with a prioritization of one of the uplink signal or the SSB.

Another innovative aspect of the subject matter described in this disclosure can be implemented in a non-transitory computer-readable medium storing code for wireless communications at a UE. The code may include instructions executable by a processor to receive control signaling that indicates a first set of resources associated with an uplink signal and a second set of resources associated with an SSB that corresponds to a non-serving cell, where the first set of resources at least partially overlaps in time with the second set of resources, and communicate with a network entity in accordance with a prioritization of one of the uplink signal or the SSB.

Another innovative aspect of the subject matter described in this disclosure can be implemented in a method for wireless communications at a network entity. The method may include transmitting control signaling that indicates a first set of resources associated with an uplink signal and a second set of resources associated with an SSB that correspond to a non-serving cell of a UE, where the first set of resources at least partially overlaps in time with the second set of resources, and communicating with the UE in accordance with a prioritization of one of the uplink signal or the SSB.

Another innovative aspect of the subject matter described in this disclosure can be implemented in an apparatus for wireless communications at a network entity. The apparatus may include one or more interfaces and a processing system. The one or more interfaces may be configured to output control signaling that indicates a first set of resources associated with an uplink signal and a second set of resources associated with an SSB that correspond to a non-serving cell of a UE, where the first set of resources at least partially overlaps in time with the second set of resources, and communicate with the UE in accordance with a prioritization of one of the uplink signal or the SSB.

Another innovative aspect of the subject matter described in this disclosure can be implemented in an apparatus for wireless communications at a network entity. The apparatus may include a processor, memory coupled with the processor, and instructions stored in the memory. The instructions may be executable by the processor to cause the apparatus to transmit control signaling that indicates a first set of resources associated with an uplink signal and a second set of resources associated with an SSB that correspond to a non-serving cell of a UE, where the first set of resources at least partially overlaps in time with the second set of resources, and communicate with the UE in accordance with a prioritization of one of the uplink signal or the SSB.

Another innovative aspect of the subject matter described in this disclosure can be implemented in another apparatus for wireless communications at a network entity. The apparatus may include means for transmitting control signaling that indicates a first set of resources associated with an uplink signal and a second set of resources associated with an SSB that correspond to a non-serving cell of a UE, where the first set of resources at least partially overlaps in time with the second set of resources, and means for communicating with the UE in accordance with a prioritization of one of the uplink signal or the SSB.

Another innovative aspect of the subject matter described in this disclosure can be implemented in a non-transitory computer-readable medium storing code for wireless communications at a network entity. The code may include instructions executable by a processor to transmit control signaling that indicates a first set of resources associated with an uplink signal and a second set of resources associated with an SSB that correspond to a non-serving cell of a UE, where the first set of resources at least partially overlaps in time with the second set of resources, and communicate with the UE in accordance with a prioritization of one of the uplink signal or the SSB.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 9 and 10 show flowcharts illustrating methods that support multiplexing and prioritization techniques for uplink signaling and non-serving cell synchronization signals.

Like reference numbers and designations in the various drawings indicate like elements.

DETAILED DESCRIPTION

Figure 1:
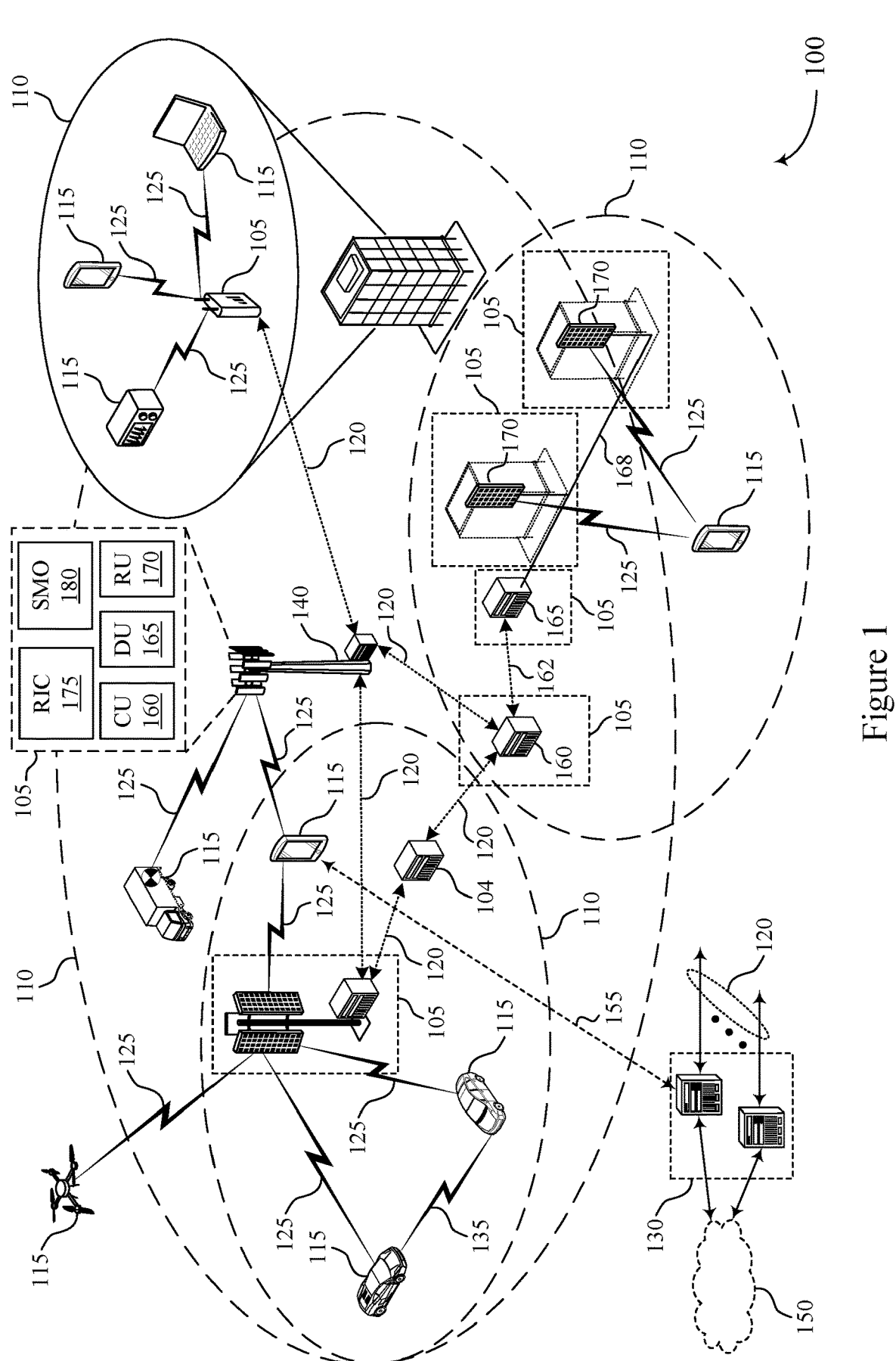
FIG. 1 shows an example wireless communications system that supports multiplexing and prioritization techniques for uplink signaling and non-serving cell synchronization signals.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G), fifth generation (5G), or sixth generation (6G), or further implementations thereof, technology.

In some wireless communications systems, a wireless device may communicate with one or more other wireless devices in accordance with a half-duplex mode (according to which the wireless device may transmit or receive at non-overlapping times) or a full-duplex mode (according to which the wireless device may transmit and receive simultaneously). Full-duplex communication may provide greater system capacity, higher data rates, and lower latency, but some systems may employ one or more scheduling constraints that hinder how much wireless devices within a system may leverage a full-duplex capable wireless device for greater autonomy or flexibility. For example, some systems may employ a scheduling constraint such that an uplink signal may not be scheduled for a set of resources that overlaps in time with a set of resources that is allocated for one or more non-serving cell synchronization signal blocks (SSBs), which may limit communication-level flexibility in some deployments, such as inter-cell multi-transmission and reception (TRP) deployments. Due to such a scheduling constraint, for example, a user equipment (UE) may be unable to prioritize (such as dynamically prioritize) one of the uplink signal or the non-serving cell SSBs, even though a full-duplex capable network entity may suitably prepare for both uplink reception and downlink transmission.

In some implementations, a UE and a full-duplex capable network entity may support one or more prioritization rules according to which the UE and the network entity may enable uplink multiplexing with non-serving cell SSBs. For example, the network entity may transmit control signaling to the UE and the control signaling may indicate (such as schedule) a first set of resources for an uplink signal and a second set of resources for one or more non-serving cell SSBs, where the first set of resources at least partially overlaps in time with the second set of resources, and the UE may prioritize one of the uplink signal or the non-serving cell SSBs in accordance with a prioritization rule. In some implementations, a prioritization rule may be associated with a duration of a scheduling offset of the uplink signal relative to a scheduling or activating control message. Additionally, or alternatively, a prioritization rule may be associated with whether the set of non-serving cell SSBs are indicated for measurement at the UE. In some aspects, the network entity may transmit an indication of the prioritization rule to the UE. Additionally, or alternatively, the prioritization rule may be configured at the UE in accordance with a network specification or may be autonomously selected or generated by the UE. The UE may transmit the uplink signal (if the uplink signal is prioritized over the non-serving cell SSBs) or may monitor for the non-serving cell SSBs (if the non-serving cell SSBs are prioritized over the uplink signal) and may either transmit or monitor for the deprioritized signaling via a subset of non-overlapping resources, drop the deprioritized signaling, or defer the deprioritized signaling to a future available resource.

Particular implementations of the subject matter described in this disclosure can be implemented to realize one or more of the following potential advantages. For example, as a result of supporting one or more prioritization rules that enable uplink multiplexing with one or more non-serving cell SSBs (such as one or more prioritization rules that lift a scheduling constraint associated with uplink signaling and downlink non-serving cell SSBs), a UE may dynamically prioritize one of the uplink signal or the non-serving cell SSBs in accordance with a respective value of each of the uplink signal and the non-serving cell SSBs. As such, the UE may leverage a full-duplex capability of a network entity to achieve greater autonomy or flexibility, as the network entity may prepare for both uplink reception and downlink transmission while the UE dynamically prioritizes one of the uplink signal or the non-serving cell SSBs. Further, such one or more prioritization rules may facilitate greater adoption of full-duplex operation, which may provide other benefits to adopting systems. For example, full-duplex operation may support longer uplink duty cycles, which may lead to latency reduction and greater uplink coverage. For example, in accordance with full-duplex operation, the UE may receive a downlink signal in "uplink only" slots, which may enable or otherwise facilitate latency savings. Further, full-duplex operation may increase system capacity, resource utilization, and spectrum efficiency and enable flexible and dynamic uplink or downlink resource adaptation according to uplink or downlink traffic in a robust (such as reliable) manner. For example, full-duplex operations may offer solutions to some dynamic time division duplexing (TDD) challenges. As such, the UE and the network entity may experience higher data rates, greater spectral efficiency, greater system capacity, and greater scheduling flexibility, among other benefits.

FIG. 1 shows an example wireless communications system 100 that supports multiplexing and prioritization techniques for uplink signaling and non-serving cell synchronization signals. The wireless communications system 100 may include one or more network entities 105, one or more UEs 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as a radio frequency (RF) access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, standalone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN (D-RAN) architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (MC) 175 (such as a Near-Real Time RIC (Near-RT MC), a Non-Real Time MC (Non-RT MC)), a Service Management and Orchestration (SMO) 180 system, or any combination thereof. An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending on which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support multiplexing and prioritization techniques for uplink signaling and non-serving cell synchronization signals as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

Signal waveforms transmitted via a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, in some implementations, refer to a sampling period of $T_s=1/(\Delta f_{max} \cdot N_f)$ seconds, for which $\Delta f_{max}$ may represent a supported subcarrier spacing, and $\Delta_f$ may represent a supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (such as using a carrier) and may be associated with an identifier for distinguishing neighboring cells (such as a physical cell identifier (PCID), a virtual cell identifier (VCID), or others). In some implementations, a cell also may refer to a coverage area 110 or a portion of a coverage area 110 (such as a sector) over which the logical communication entity operates. Such cells may range from smaller areas (such as a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (such as several kilometers in radius) and may allow unrestricted access by the UEs 115 with service subscriptions with the network provider supporting the macro cell. A small cell may be associated with a lower-powered network entity 105 (such as a lower-powered BS 140), as compared with a macro cell, and a small cell may operate using the same or different (such as licensed, unlicensed) frequency bands as macro cells. Small cells may provide unrestricted access to the UEs 115 with service subscriptions with the network provider or may provide restricted access to the UEs 115 having an association with the small cell (such as the UEs 115 in a closed subscriber group (CSG), the UEs 115 associated with users in a home or office). A network entity 105 may support one or multiple cells and also may support communications via the one or more cells using one or multiple component carriers. In some implementations, a carrier may support multiple cells, and different cells may be configured according to different protocol types (such as MTC, narrowband IoT (NB-IoT), enhanced mobile broadband (eMBB)) that may provide access for different types of devices.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHz.

The wireless communications system 100 also may operate using a super high frequency (SHF) region, which may be in the range of 3 GHz to 30 GHz, also known as the centimeter band, or using an extremely high frequency (EHF) region of the spectrum (such as from 30 GHz to 300 GHz), also known as the millimeter band. In some implementations, the wireless communications system 100 may support millimeter wave (mmW) communications between the UEs 115 and the network entities 105 (such as B Ss 140, RUs 170), and EHF antennas of the respective devices may be smaller and more closely spaced than UHF antennas. In some implementations, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be based on a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

Various devices within the wireless communications system 100 may support one or more levels of duplex operation, which may depend on or be associated with a deployment scenario, a duplex mode (such as TDD only, FDD only, or both TDD and FDD), or an interference management procedure. In some aspects, a wireless device (such as a UE 115, a network entity 105, or an IAB node 104) within the wireless communications system 100 may support half-duplex or full-duplex operation. For example, a network entity 105 may support various types of MIMO communication, including downlink multi-user MIMO (MU-MIMO) according to which the network entity 105 may transmit downlink signaling to two different UEs 115 simultaneously, uplink MU-MIMO according to which the network entity may receive uplink signaling from two different UEs 115 simultaneously, or downlink and uplink MU-MIMO (which may be referred to herein as full-duplex operation) according to which the network entity 105 may transmit downlink signaling to a first UE 115 while simultaneously receiving uplink signaling from a second UE 115. A network entity 105 may further support enhanced MIMO (eMIMO) or further enhanced MIMO (FeMIMO), which may be associated with an FeMIMO beam management session. In accordance with full-duplex operation, a wireless device may be capable of transmitting and receiving simultaneously. In other words, the wireless device may support simultaneous uplink and downlink transmissions (such as an uplink transmission and a downlink transmission that at least partially overlap in time).

Full-duplex operation may include subband full-duplex (SBFD) according to which simultaneous transmission or reception of downlink or uplink signaling may be on a per subband basis or in-band full-duplex (IBFD). In accordance with SBFD, a component carrier bandwidth may be separated, in the frequency domain, to a set of one or more downlink portions and a set of one or more uplink portions for a given time duration (such as for a given slot). For example, within a slot, downlink communication may occur via a first set of one or more frequency bands and uplink communication may occur via a second set of one or more frequency bands. Further, full-duplex operation may include simultaneous transmission and reception on a same symbol, TTI, or slot.

In accordance with half-duplex operation, a wireless device may transmit or receive, but may not transmit and receive simultaneously. A wireless device may support full-duplex operation across various RF bands. For example, a wireless device may support simultaneous uplink and downlink transmissions within a frequency range 1 (FR1) band, within an FR2 band, or across FR1 and FR2 bands. In scenarios in which a wireless device supports simultaneous uplink and downlink transmissions within an FR2 band, the wireless device may further support associated aspects of procedures to enable or facilitate suitable FR2 communication.

Full-duplex capability may be present at either or both of a network entity 105 or a UE 115. In scenarios in which a UE 115 is capable of full-duplex operation, the UE 115 may use a first antenna panel, module, or set of elements for uplink transmission (such as transmitting to a network entity 105) and may use a second antenna panel, module, or set of elements for downlink reception (such as receiving from a network entity 105). In scenarios in which a network entity 105 is capable of full-duplex operation, the network entity 105 may use a first antenna panel, module, or set of elements for uplink reception (such as receiving from a UE 115) and may use a second antenna panel, module, or set of elements for downlink transmission (such as transmitting to a UE 115). In some aspects, a full-duplex capability may be conditional on one or more transmission parameters. For example, a full-duplex capability may be conditional on a beam separation (such as a separation between a first directional beam used for uplink and a second directional beam used for downlink), which may relate or contribute to self-interference between downlink and uplink signaling and clutter (such as clutter echoes, which may refer to interference-causing scattered signals). As such, a wireless device may use full-duplex operation if a first directional beam used for uplink transmission or reception is sufficiently separated from a second directional beam used for downlink transmission or reception in a spatial domain. In some aspects, an amount of self-interference may be associated with or correlate to a distance d between a transmit antenna panel and a receive antenna panel.

Further, in some systems, one or more constraints may limit full-duplex operation at a network entity 105 associated with both a serving cell and a non-serving cell for a UE 115. For example, in some systems, a UE 115 may not expect to receive control signaling that schedules an uplink signal for a serving cell that overlaps in time with an SSB of a non-serving cell. Such a scheduling constraint, however, may adversely impact full-duplex operation at a network entity 105 while also limiting flexibility at the UE 115 (as the UE 115 may be unable to select which of the uplink signal or the non-serving cell SSBs to transmit or receive, respectively).

Accordingly, in some implementations, a UE 115 may support or facilitate full-duplex operation at a network entity 105 in accordance with one or more prioritization rules that indicate whether the UE 115 prioritizes an uplink signal for a serving cell or an SSB of a non-serving cell. For example, the network entity 105 may transmit control signaling (such as one or more control messages) to the UE 115 that schedules an uplink signal for the serving cell during a first set of time domain resources and a set of one or more SSBs of the non-serving cell during a second set of time domain resources, where the first set and the second set of time domain resources at least partially overlap. The UE 115, which may support half-duplex operation, may selectively enable the one or more prioritization rules in accordance with the scheduling conflict between the uplink signal and the one or more non-serving cell SSBs to select, identify, ascertain, or otherwise determine which of the uplink signal or the non-serving cell SSBs to prioritize. In accordance with the one or more prioritization rules, the UE 115 may either monitor for the non-serving cell SSBs or may transmit the uplink signal. The network entity may similarly select, identify, ascertain, or otherwise determine which of the uplink signal or the non-serving cell SSBs the UE 115 is to prioritize in accordance with the one or more prioritization rules, prepare for both a transmission of the non-serving cell SSBs and a reception of the uplink signal (in accordance with a full-duplex capability of the network entity 105), or both.

Figure 2:
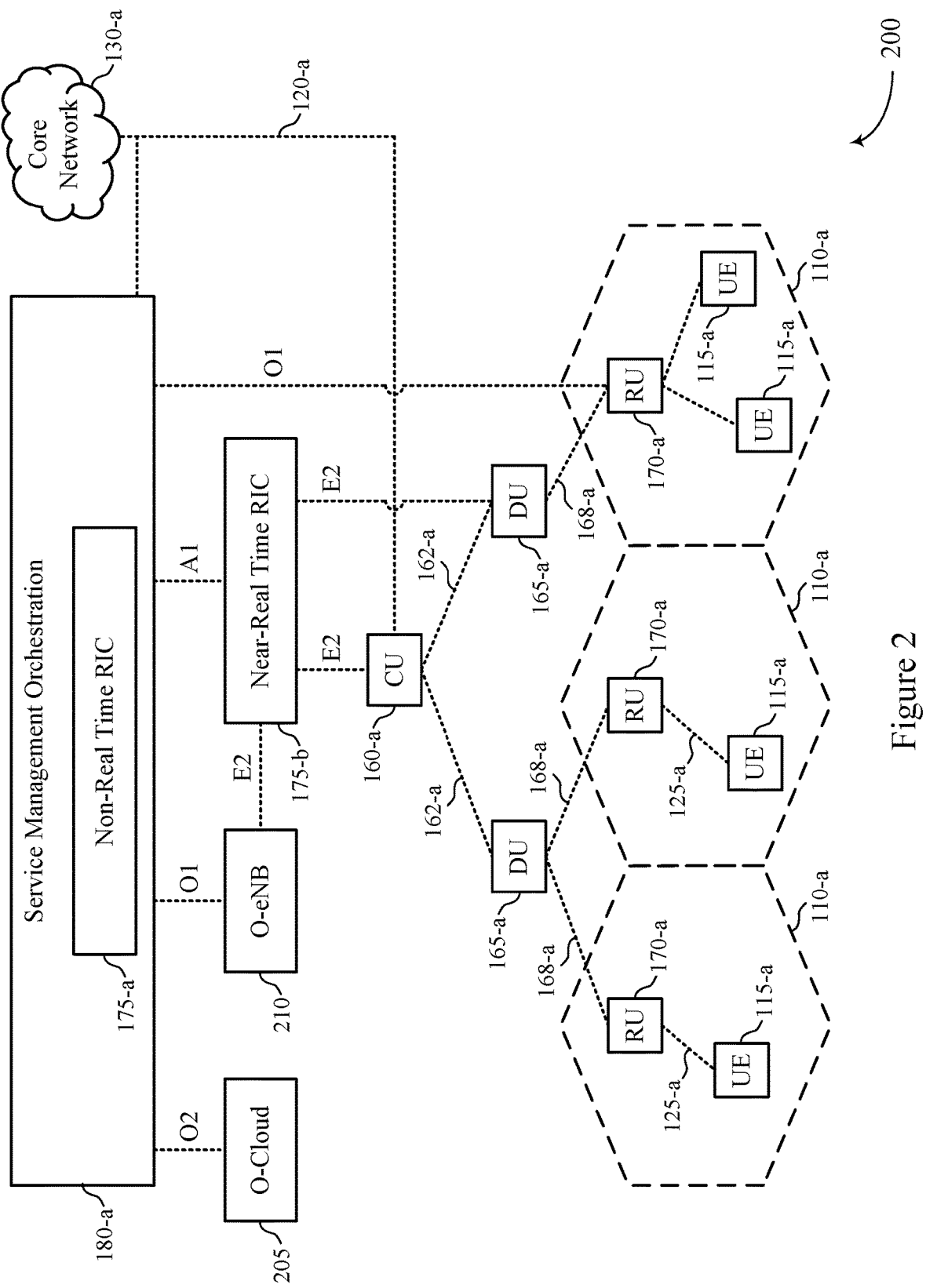
FIG. 2 shows an example network architecture that supports multiplexing and prioritization techniques for uplink signaling and non-serving cell synchronization signals.

FIG. 2 shows an example network architecture 200 (such as a disaggregated base station architecture or a disaggregated RAN architecture) that supports multiplexing and prioritization techniques for uplink signaling and non-serving cell synchronization signals. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (such as a Near-RT RIC 175-b via an E2 link, or a Non-RT MC 175-a associated with an SMO 180-a (such as an SMO Framework), or both). A CU 160-a may communicate with one or more DUs 165-a via respective midhaul communication links 162-a (such as an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (such as CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (such as data, information) via a wired or wireless transmission medium. Each network entity 105, or an associated processor (such as controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (such as an RF transceiver) configured to receive or transmit signals, or both, over a wireless transmission medium to one or more of the other network entities 105.

In some implementations, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (such as CU-UP), control plane functionality (such as CU-CP), or a combination thereof. In some implementations, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (such as base station functions, RAN functions) to control the operation of one or more RUs 170-a. In some implementations, a DU 165-a may host, at least partially, one or more of an RLC layer, a MAC layer, and one or more aspects of a PHY layer (such as a high PHY layer, such as modules for FEC encoding and decoding, scrambling, modulation and demodulation, or the like)

depending, at least in part, on a functional split, such as those defined by the 3rd Generation Partnership Project (3GPP). In some implementations, a DU 165-*a* may further host one or more low PHY layers. Each layer may be implemented with an interface configured to communicate signals with other layers hosted by the DU 165-*a*, or with control functions hosted by a CU 160-*a*.

In some implementations, lower-layer functionality may be implemented by one or more RUs 170-*a*. For example, an RU 170-*a*, controlled by a DU 165-*a*, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some implementations, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (such as an O1 interface). For virtualized network entities 105, the SMO 180-*a* may be configured to interact with a cloud computing platform (such as an O-Cloud 205) to perform network entity life cycle management (such as to instantiate virtualized network entities 105) via a cloud computing platform interface (such as an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (such as via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (such as via an A1 interface) the Near-RT RIC 175-*b*. The Near-RT RIC 175-*b* may be configured to include a logical function that enables near-real-time control and optimization of RAN elements and resources via data collection and actions over an interface (such as via an E2 interface) connecting one or more CUs 160-*a*, one or more DUs 165-*a*, or both, as well as an O-eNB 210, with the Near-RT RIC 175-*b*.

In some implementations, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some implementations, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (such as reconfiguration via 01) or via generation of RAN management policies (such as A1 policies).

In some systems, a network entity 105 or one or more TRPs, or any combination thereof, may communicate with (such as transmit to or receive from, or both) a UE 115-*a* in accordance with a "baseline" non-full-duplex operation. In such systems, flexible TDD may be disabled at both the network entity 105 and the UE 115-*a*. Alternatively, a network entity 105 or one or more TRPs, or any combination thereof, may communicate with (such as transmit to or receive from, or both) a UE 115-*a* in accordance with any one or more of various types of full-duplex. Such types of full-duplex may involve full-duplex operation at the UE 115-*a* or at the network entity 105 (optionally via one or more TRPs), or at both.

In a first example type of full-duplex, a UE 115-*a* may communicate with a first TRP (such as a TRP 1) via downlink (such that the TRP 1 transmits signaling to the UE 115-*a*) and the UE 115-*a* may communicate with a second TRP (such as a TRP 2) via uplink (such that the UE 115-*a* transmits signaling to the TRP 2). In such a first example type of full-duplex (which may be associated with an mTRP deployment), flexible TDD may be disabled at a network entity 105 and flexible TDD may be enabled at the UE 115-*a*. In a second example type of full-duplex, a network entity 105 may communicate with a first UE 115-*a* via downlink and may communicate with a second UE 115-*a* via uplink. In such a second example type of full-duplex (which may be associated with an IAB deployment), flexible TDD may be enabled at the network entity 105 and flexible TDD may be disabled at the first and second UEs 115. In a third example type of full-duplex, a network entity 105 may communicate with a UE 115-*a* via both downlink and uplink. In such a third example type of full-duplex, flexible TDD may be enabled at both the network entity 105 and the UE 115-*a*.

Further, one or more network entities 105 or one or more TRPs, or any combination thereof, may communicate with (such as transmit to or receive from, or both) one or more UEs 115-*a* in accordance with one or more of various deployment scenarios that leverage a type of full-duplex. In a first deployment scenario, a full-duplex network entity 105 (such as a BS 140 as illustrated by and described with reference to FIG. 1) may communicate with multiple half-duplex UEs 115-*a*. For example, a first network entity 105 may transmit downlink signaling to a first UE 115-*a* and may simultaneously receive uplink signaling from a second UE 115-*a*. A second network entity 105 may transmit downlink signaling to a third UE 115-*a* and may simultaneously receive uplink signaling from a fourth UE 115-*a*. In such deployment scenarios, cross-link interference (CLI) may occur between the various communicating devices (where uplink signaling may interference with downlink signaling) and each of the two full-duplex network entities 105 may experience some amount of self-interference.

In a second deployment scenario, a full-duplex network entity 105 may communicate with a full-duplex UE 115-*a* (such as a full-duplex customer premises equipment (CPE)). For example, the full-duplex network entity 105 may transmit downlink signaling to the full-duplex UE 115-*a* and simultaneously receive uplink signaling from the full-duplex UE 115-*a*. In some aspects, the full-duplex network entity

105 also may transmit downlink signaling to another UE 115-*a* (such as a half-duplex UE 115-*a*) and, in such aspects, CLI may occur between the two UEs 115-*a*. Further, the full-duplex network entity 105 may experience CLI from another network entity 105 and both of the full-duplex network entity 105 and the full-duplex UE 115-*a* may experience self-interference.

In a third deployment scenario, a half-duplex network entity 105 or TRP (such as in an mTRP deployment) may communicate with a full-duplex UE 115-*a* (such as a full-duplex CPE). For example, a first network entity 105 or TRP may transmit downlink signaling to the full-duplex UE 115-*a* and the full-duplex UE 115-*a* may simultaneously transmit uplink signaling to a second network entity 105 or TRP. In some aspects, the first network entity 105 or TRP also may transmit downlink signaling to another UE 115-*a* (such as a half-duplex UE 115-*a*) and, in such aspects, CLI may occur between the two UEs 115-*a*. Further, the two network entities 105 or TRPs may experience CLI and the full-duplex UE 115-*a* may experience self-interference.

In a fourth deployment scenario, a full-duplex IAB node may communicate with various UEs 115-*a* (such as half-duplex UEs 115-*a*). For example, a parent node (such as an IAB donor) may control or operate multiple IAB nodes 104 and one or more of the multiple IAB nodes 104 may support full-duplex operation. For example, the parent node may control or operate a first IAB node 104 that is capable of transmitting downlink signaling to a first UE 115-*a* and simultaneously receiving uplink signaling from a second UE 115-*a* and may control or operate a second IAB node 104 that is capable of transmitting downlink signaling to a third UE 115-*a* and simultaneously receiving uplink signaling from a fourth UE 115-*a*. In such deployments, the first and second IAB nodes 104 may experience CLI from each other or self-interference, or both. In some aspects, the IAB nodes 104 may support a conditional duplexing capability. Additionally, or alternatively, the IAB nodes 104 may support single frequency full-duplex and FDM or space division multiplexing (SDM) with a resource block group (RBG) granularity.

In some aspects, a network entity 105, one or more TRPs, and a UE 115-*a* may support various evaluation techniques and performance evaluation metrics associated with different deployment scenarios for full-duplex operation (such as for NR duplexing). Further, a network entity 105, one or more TRPs, and a UE 115-*a* may support one or more techniques to support co-existence with other systems in any co-channels or adjacent channels for subband non-overlapping full-duplex operation or for dynamic or flexible TDD, or for both. For example, a network entity 105, one or more TRPs, and a UE 115-*a* may support techniques associated with duplex operation evolution for NR TDD across various spectrums, including in an unpaired spectrum. In such examples, the network entity 105 (via the one or more TRPs) may support full-duplex operation, a UE 115-*a* may support half-duplex operation, and the network entity 105 and the UE 115-*a* may configure or expect no restrictions on which frequency ranges are available for use.

Such techniques may include various full-duplex types or schemes and corresponding metrics to evaluate a performance of such full-duplex types or schemes, inter-network entity 105 and inter-UE 115-*a* CLI mitigation techniques, intra-subband CLI and inter-subband CLI mitigation techniques (such as in the implementation of subband non-overlapping full-duplex), or a metric-based evaluation procedure for an impact of full-duplex operation on half-duplex operation (assuming co-existence in co-channel and adjacent channels). Additionally, or alternatively, such techniques may include a metric-based evaluation procedure for an impact on RF constraints considering adjacent channel co-existence or for an impact on RF constraints considering self-interference, inter-subband CLI and inter-operator CLI at network entities 105, and inter-subband CLI and inter-operator CLI at UEs 115-*a*. Further, such techniques may include antenna or RF and algorithm design for interference mitigation, including antenna isolation, transmission interference management suppression in a receive-side part, filtering, and digital interference suppression. Further, such techniques may comply with one or more regulatory or network specifications associated with full-duplex operation in TDD unpaired spectrums.

In some implementations, various components of the network architecture 200 may support one or more prioritization rules that enable a network entity 105 to schedule a UE 115-*a* with an uplink signal for a serving cell that at least partially overlaps in time with a set of one or more non-serving cell SSBs. For example, a network entity 105 may control or operate multiple TRPs via which the network entity 105 may transmit or receive, or both, in an inter-cell multi-TRP (mTRP) deployment, where different TRPs may be associated with different DUs 165-*a* or different RUs 170-*a*, or any combination thereof. In some aspects, the network entity 105 may control or operate a first TRP as a serving cell for a UE 115-*a* and may control or operate a second TRP as a non-serving cell for the UE 115-*a* and, in accordance with the one or more prioritization rules, may schedule an uplink signal for transmission from the UE 115-*a* to the first TRP that at least partially overlaps in time with a set of non-serving cell SSBs transmitted from the second TRP.

The UE 115-*a* may select, identify, ascertain, or otherwise determine which of the uplink signal or the non-serving cell SSBs to prioritize in accordance with the one or more prioritization rules and may prepare (such as configure one or more transceiver chains, antenna panels, antenna modules, or antenna elements) to either transmit the uplink signal or monitor for the non-serving cell SSBs accordingly. In other words, the UE 115-*a* may communicate with (such as transmit to or receive from, or both) the network entity 105 via the first TRP or the second TRP in accordance with a prioritization of one of the uplink signal or the non-serving cell SSBs. As such, the UE 115-*a* may transmit the uplink signal to the first TRP of the network entity 105 if the uplink signal is prioritized or may monitor for the non-serving cell SSBs from the second TRP if the non-serving cell SSBs are prioritized.

In some implementations, a prioritization rule may be associated with a type of an indication of a set of resources for the non-serving cell SSBs. For example, if the indication of the resources for the non-serving cell SSBs indicates the non-serving cell SSBs for measurement by the UE 115-*a*, the UE 115-*a* may prioritize the non-serving cell SSBs. Alternatively, if the indication of the resources for the non-serving cell SSBs indicates the non-serving cell SSBs via a transmission configuration indicator (TCI) state activation or a neighbor cell SSB information element, the UE 115-*a* may prioritize the uplink signal. Additionally, or alternatively, a prioritization rule may be associated with a time duration of a scheduling offset of the uplink signal. For example, if a duration of a scheduling offset for the uplink signal satisfies a threshold duration, the UE 115-*a* may prioritize the uplink signal. Otherwise, the UE 115-*a* may prioritize the non-serving cell SSBs.

Figure 3:
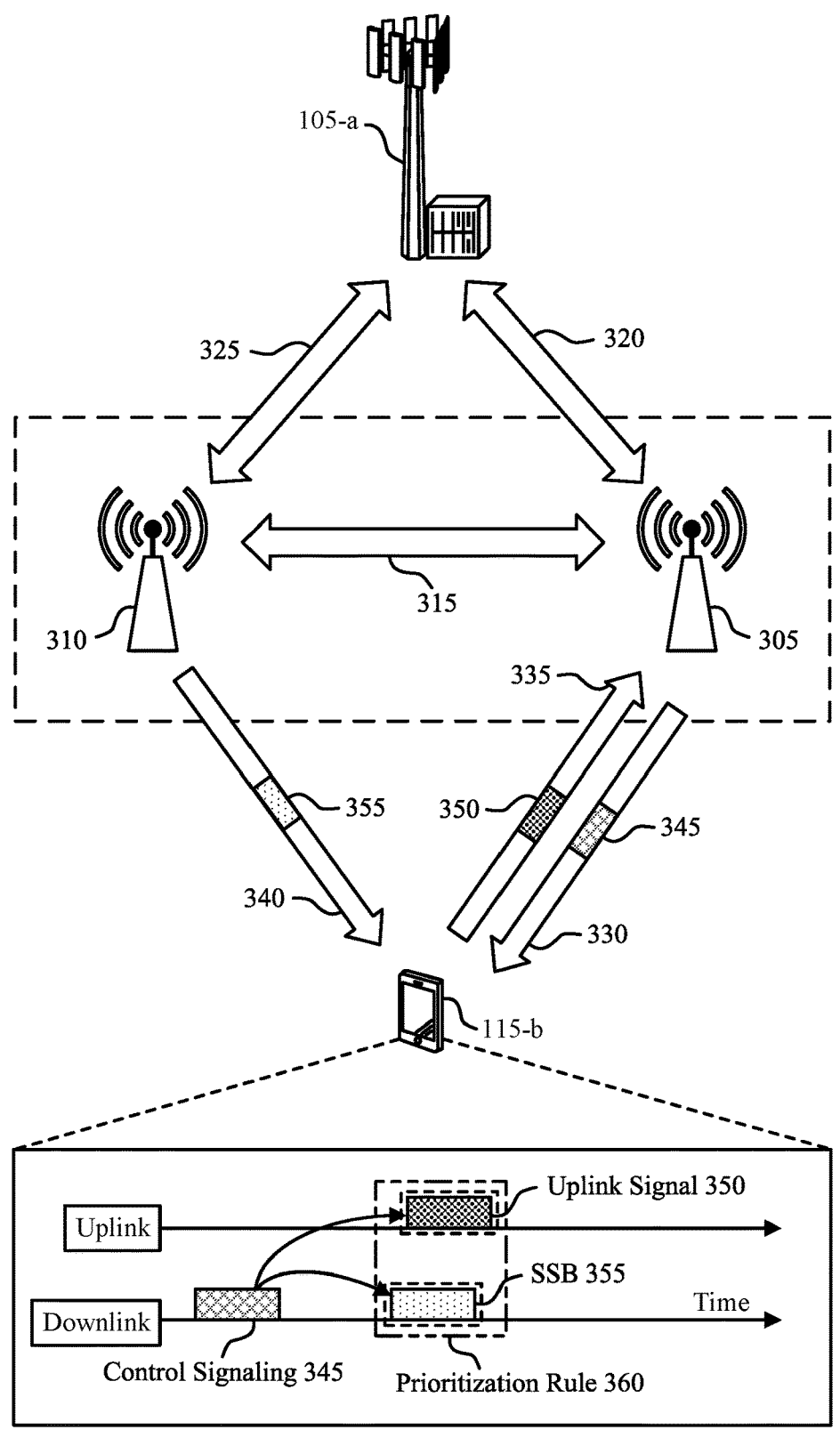
FIG. 3 shows an example signaling diagram that supports multiplexing and prioritization techniques for uplink signaling and non-serving cell synchronization signals.

FIG. 3 shows an example signaling diagram 300 that supports multiplexing and prioritization techniques for uplink signaling and non-serving cell synchronization signals. The signaling diagram 300 may implement or be implemented to realize aspects of the wireless communications system 100 or the network architecture 200. For example, the signaling diagram 300 illustrates communication between a network entity 105-*a* and a UE 115-*b* via a TRP 305 and a TRP 310. The network entity 105-*a* may be an example of a network entity 105 as illustrated by or described with reference to FIGS. 1 and 2. The UE 115-*b* may be an example of a UE 115 or a UE 115-*a* as illustrated by or described with reference to FIGS. 1 and 2.

The TRP 305 and the TRP 310 may be associated with the network entity 105-*a* in any one or more of various manners. Further, the TRP 305 and the TRP 310 may communicate with each other via a wired or wireless link. For example, the TRP 305 and the TRP 310 may communicate with each other via a communication link 315, which may be an example of a D2D communication link 135, a communication link 125, a backhaul communication link 120, a midhaul communication link 162, or a fronthaul communication link 168, and which may be wired or wireless. In some deployments, the TRP 305 and the TRP 310 may be collocated at the network entity 105-*a*. In such deployments, the TRP 305 and the TRP 310 may be (or may be coupled with) different antenna panels of the network entity 105-*a*. In some other deployments, the TRP 305 and the TRP 310 may be located at different geographic positions (such as may be non-collocated), but may both be controlled by the network entity 105-*a* via wired or wireless signaling. In such deployments, the TRP 305 and the TRP 310 may be part of a D-RAN or an O-RAN network architecture, such as the network architecture 200 as illustrated by and described with reference to FIG. 2.

The TRP 305 may communicate with (such as transmit to or receive from, or both) the network entity 105-*a* via a communication link 320, which may be an example of a D2D communication link 135, a communication link 125, a backhaul communication link 120, a midhaul communication link 162, or a fronthaul communication link 168, and which may be wired or wireless. Similarly, the TRP 310 may communicate with (such as transmit to or receive from, or both) the network entity 105-*a* via a communication link 325, which may be an example of a D2D communication link 135, a communication link 125, a backhaul communication link 120, a midhaul communication link 162, or a fronthaul communication link 168, and which may be wired or wireless.

The TRP 305 may transmit downlink signaling to the UE 115-*b* via a communication link 330 (such as a downlink) and may receive uplink signaling from the UE 115-*b* via a communication link 335 (such as an uplink). The TRP 310 may transmit downlink signaling to the UE 115-*b* via a communication link 340 (such as a downlink). Further, although described as the communication link 340, the communication link 340 may refer to any link or channel via which the UE 115-*b* may receive signaling from the TRP 310 and may not necessarily be an established link for data transmissions (as the TRP 310 may be associated with a non-serving cell for the UE 115-*b*).

In scenarios in which the TRP 305 is (such as is associated with) a serving cell for the UE 115-*b* and the TRP 310 is (such as is associated with) a non-serving cell for the UE 115-*b*, some systems may employ one or more scheduling constraints associated with overlapping transmissions between the serving cell and the non-serving cell. For example, some systems may specify how the UE 115-*b* may not be (such as may not expect to be) simultaneously scheduled to transmit an uplink signal 350 to the TRP 305 and to monitor for one or more non-serving cell SSBs 355 from the TRP 310. In other words, for inter-cell mTRP, the UE 115-*b* may not transmit an uplink signal 350 in a slot or in one or more symbols if, in the time domain, the uplink signal 350 overlaps with an SSB of a serving cell physical cell identifier (PCI) or an SSB 355 associated with an active additional PCI (such as a PCI associated with an active non-serving cell). Such a scheduling constraint, however, may hinder (such as not leverage or take advantage of) a full-duplex capability of the network entity 105-*a* (via the TRP 305 and the TRP 310). Further, such a scheduling constraint may restrict flexibility at the UE 115-*b*, as the UE 115-*b* may be unable to leverage the full-duplex capability of the network entity 105-*a* (via the TRP 305 and the TRP 310) and dynamically prioritize one of the uplink signal 350 or the non-serving cell SSBs 355.

In some implementations, the network entity 105-*a* and the UE 115-*b* may support a prioritization rule 360 according to which the network entity 105-*a* and the UE 115-*b* may enable and reconcile a scheduling of an uplink signal 350 and of one or more non-serving cell SSBs 355 that at least partially overlap in time. For example, the UE 115-*b* may receive control signaling 345 that schedules the uplink signal 350 for a first set of time domain resources and the one or more non-serving cell SSBs 355 for a second set of time domain resources that at least partially overlap in time with the first set of time domain resources and the UE 115-*b* may transmit the uplink signal 350 or monitor for the non-serving cell SSBs 355 in accordance with the prioritization rule 360. The control signaling 345 may indicate information associated with a non-serving cell SSB configuration for downlink and information associated with a configured uplink transmission. The control signaling 345 may be RRC signaling (such as one or more RRC information elements), one or more MAC control elements (MAC-CEs), or one or more downlink control information (DCI) messages, or any combination thereof.

As such, the network entity 105-*a* and the UE 115-*b* may allow uplink multiplexing with non-serving cell SSBs 355 at least in implementations in which the UE 115-*b* (which may operate in a half-duplex mode) supports full-duplex operation at the network entity 105-*a*. In other words, the network entity 105-*a* and the UE 115-*b* may relax a scheduling constraint associated with uplink signals 350 and non-serving cell SSBs 355, which may enable the UE 115-*b* to leverage the full-duplex capability of the network entity 105-*a* and prioritize one of the uplink signal 350 or the non-serving cell SSBs 355 in accordance with the prioritization rule 360. For example, the network entity 105-*a* may prepare for both downlink transmission and uplink reception simultaneously in accordance with the full-duplex capability of the network entity 105-*a* and, generally, the network entity 105-*a* may detect, ascertain, identify, or otherwise determine which of the downlink or uplink is prioritized at the UE 115-*b* in accordance with UE feedback. For example, if the network entity 105-*a* receives an uplink transmission (such as if uplink reception is detected), the network entity 105-*a* may detect or ascertain that the uplink transmission was prioritized at the UE 115-*b*. Alternatively, if the network entity 105-*a* receives an acknowledgement (ACK) for a downlink transmission, the network entity 105-*a* may detect or ascertain that the downlink transmission was prioritized at the UE 115-*b*.

The uplink signal 350 may be a physical uplink control channel (PUCCH) transmission, a physical uplink shared channel (PUSCH) transmission, a physical random access channel (PRACH) transmission, or a sounding reference signal (SRS) transmission. The uplink signal 350 may be an uplink configured grant, such as a configured grant PUSCH (CG-PUSCH), or may be dynamically or semi-persistently scheduled. The non-serving cell SSBs 355 may include SSBs configured via a neighbor SSB information element, SSBs configured or activated for L1 measurement, SSBs associated with an activated or indicated TCI state, or any combination thereof.

In accordance with the prioritization rule 360, which may be triggered by the overlapping of the uplink signal 350 and the non-serving cell SSBs 355, the UE 115-*b* may select one of the uplink signal 350 or the non-serving cell SSBs 355. In implementations in which the UE 115-*b* prioritizes the uplink signal 350, the UE 115-*b* may transmit the uplink signal 350 to the network entity 105-*a* via the TRP 305 (such as the serving cell for the UE 115-*b*) and may refrain from monitoring for the non-serving cell SSBs 355. Alternatively, in implementations in which the UE 115-*b* prioritizes the non-serving cell SSBs 355, the UE 115-*b* may monitor for the non-serving cell SSBs 355 from the network entity 105-*a* via the TRP 310 and may refrain from transmitting the uplink signal 350.

The UE 115-*b* and the network entity 105-*a* may support additional signaling rules associated with a deprioritized signal (which may be either the non-serving cell SSBs 355 or the uplink signal 350). In some implementations, the UE 115-*b* may drop a part of the deprioritized signal (such as the part that overlaps in time with the prioritized signal) in accordance with such additional signaling rules. In some other implementations, the UE 115-*b* may completely drop the deprioritized signal in accordance with such additional signaling rules. Additionally, or alternatively, the UE 115-*b* and the network entity 105-*a* may defer the deprioritized signal to a future available resource. In some implementations, the network entity 105-*a* may configure or indicate the future available resource. Additionally, or alternatively, the future available resource may be defined by a network specification. For example, the future available resource may be a next or earliest available resource. In such implementations in which the UE 115-*b* and the network entity 105-*a* defer the deprioritized signal to a future available resource and in examples in which the uplink signal 350 is deprioritized, the UE 115-*b* may defer the uplink signal 350 (or a configured grant occasion associated with the uplink signal 350) to a next earliest slot that can accommodate the uplink signal 350 in accordance with checking for resource availability on a slot-by-slot basis.

In some implementations, the prioritization rule 360 may be configured or stored at the UE 115-*b*. In such implementations, the UE 115-*b* may autonomously (such as independently) select or generate the prioritization rule 360 or may be configured with the prioritization rule 360 in accordance with a network specification (such that all UEs 115 within a system employ the same prioritization rule 360). In implementations in which the prioritization rule 360 is autonomously or independently selected or generated by the UE 115-*b*, the network entity 105-*a* may prepare for both downlink transmission (via the TRP 310) and uplink reception (via the TRP 305) simultaneously. In such implementations, the network entity 105-*a* may transmit the non-serving cell SSBs 355 and monitor for the uplink signal 350 simultaneously and may ascertain or identify which is prioritized at the UE 115-*b* depending on whether uplink reception is detected (such as if the network entity 105-*a* receives and decodes the uplink signal 350). In implementations in which the prioritization rule 360 is configured in accordance with a network specification, the network entity 105-*a* may employ the same prioritization rule 360 to prioritize one of the non-serving cell SSBs 355 or the uplink signal 350 and may prepare for reception or transmission accordingly.

Additionally, or alternatively, the UE 115-*b* may receive signaling (such as explicit signaling) from the network entity 105-*a* that indicates the prioritization rule 360. For example, the network entity 105-*a* may indicate the prioritization rule 360 via RRC signaling, a MAC-CE, or DCI, or any combination thereof. In some implementations, the network entity 105-*a* may select and indicate the prioritization rule 360 from a set of available prioritization rules 360. The selection may be associated with one or more communication metrics, such as a latency constraint or a quality of service (QoS) constraint. Additional details relating to the prioritization rule 360 that the UE 115-*b* may implement are illustrated by and described with reference to FIGS. 4 and 5.

Further, a rule enabling non-serving cell SSB and configured uplink multiplexing or the prioritization rule 360, or both, may be applicable for downlink and uplink signals associated with various resource allocations. For example, the rule enabling non-serving cell SSB and configured uplink multiplexing or the prioritization rule 360, or both, may be applied for downlink and uplink signals on a same component carrier or across different component carriers. The different component carriers may be in a same band or in different bands in a carrier aggregation (CA) deployment or in a dual-connectivity (DC) deployment.

Figure 4:
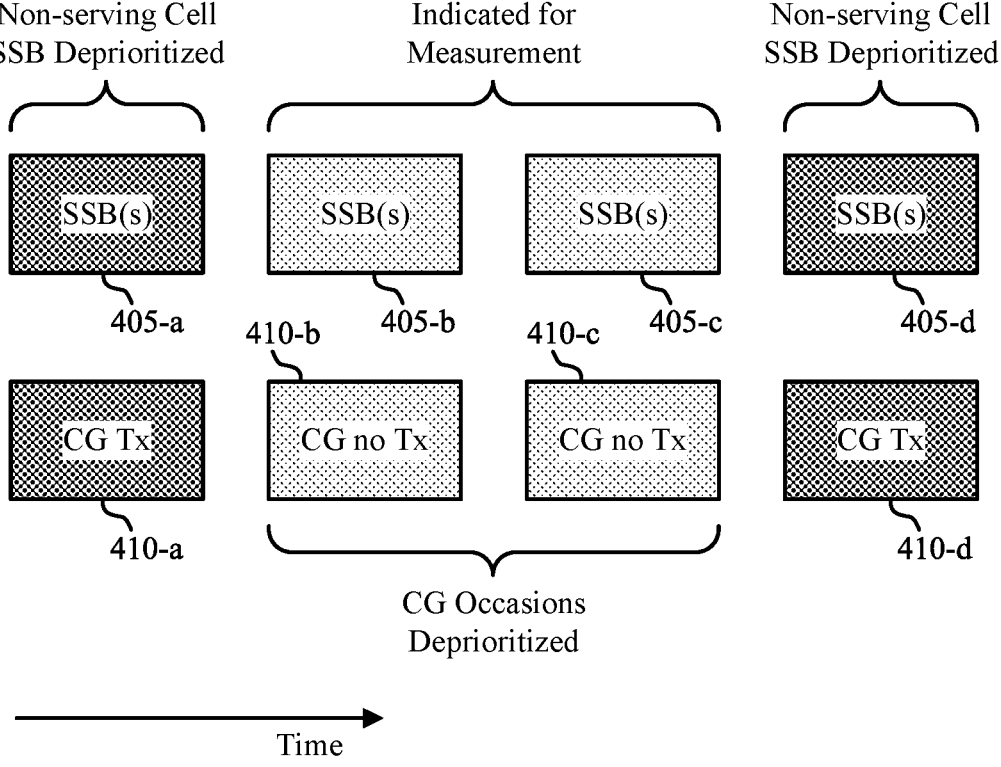
FIGS. 4 and 5 show example prioritization rules that support multiplexing and prioritization techniques for uplink signaling and non-serving cell synchronization signals.

FIG. 4 shows an example prioritization rule 400 that supports multiplexing and prioritization techniques for uplink signaling and non-serving cell synchronization signals. The prioritization rule 400 may implement or be implemented to realize aspects of the wireless communications system 100, the network architecture 200, or the signaling diagram 300. For example, the prioritization rule 400 may be an example of the prioritization rule 360 as illustrated by and described with reference to FIG. 3. Accordingly, a UE 115 and a network entity 105 may use the prioritization rule 400 to enable uplink multiplexing with downlink non-serving cell SSBs 355, which may support full-duplex operation at the network entity 105 and provide greater flexibility at the UE 115. The UE 115 as described with reference to FIG. 4 may be an example of a UE 115, a UE 115-*a*, or a UE 115-*b* as illustrated by and described with reference to FIGS. 1-3. The network entity 105 as described with reference to FIG. 4 may be an example of a network entity 105 or a network entity 105-*a* as illustrated by and described with reference to FIGS. 1-3.

In accordance with the prioritization rule 400, the UE 115 may prioritize between non-serving cell SSB occasions 405 (which may generally refer to any one or more of a non-serving cell SSB occasion 405-*a*, a non-serving cell SSB occasion 405-*b*, a non-serving cell SSB occasion 405-*c*, or a non-serving cell SSB occasion 405-*d*) and uplink configured grant occasions 410 (which may generally refer to any one or more of an uplink configured grant occasion 410-*a*, an uplink configured grant occasion 410-*b*, an uplink configured grant occasion 410-*c*, or an uplink configured grant occasion 410-*d*). As illustrated by FIG. 4, the non-serving cell SSB occasion 405-*a* may at least partially overlap in time with the uplink configured grant occasion 410-*a*, the non-serving cell SSB occasion 405-*b* may at least partially overlap in time with the uplink configured grant occasion 410-*b*, the non-serving cell SSB occasion 405-*c* may at least partially overlap in time with the uplink configured grant occasion 410-*c*, and the non-serving cell SSB occasion 405-*d* may at least partially overlap in time with the uplink configured grant occasion 410-*d*. The overlap may be at least a one symbol overlap. As such, the prioritization rule 400 may be indicated, defined, or configured (such as in accordance with a network specification) for downlink non-serving cell SSB transmissions and configured uplink transmissions when such transmissions are scheduled for a same symbol.

In some implementations, and as illustrated by the prioritization rule 400, the network entity 105 may transmit an indication of a set of resources for each of the sets of non-serving cell SSB occasions 405 and the prioritization rule 400 may depend on a type of the indication of the set of resources for each of the non-serving cell SSB occasions 405. In such implementations, the UE 115 may prioritize a non-serving cell SSB occasion 405 if a corresponding set of non-serving cell SSBs 355 are indicated for measurement at the UE 115 and may prioritize an uplink configured grant occasion 410 otherwise. For example, the UE 115 may prioritize an uplink configured grant occasion 410 if an overlapping non-serving cell SSB occasion 405 is not indicated, by the network entity 105, for measurement at the UE 115. In such examples, the UE 115 may prioritize an uplink configured grant occasion 410 if an overlapping non-serving cell SSB occasion 405 is indicated via an activated or enabled TCI state or indicated via a neighbor cell SSB information element, among other example indications that do not indicate the non-serving cell SSB occasion 405 for measurement at the UE 115. Alternatively, if a non-serving cell SSB occasion 405 is indicated for measurement at the UE 115, the UE 115 may prioritize the non-serving cell SSB occasion 405 over an overlapping uplink configured grant occasion 410.

As such, in scenarios in which the non-serving cell SSB occasion 405-*a* and the non-serving cell SSB occasion 405-*d* are not indicated for measurement at the UE 115, the UE 115 may deprioritize the non-serving cell SSB occasion 405-*a* and the non-serving cell SSB occasion 405-*d* and may instead prioritize the uplink configured grant occasion 410-*a* and the uplink configured grant occasion 410-*d*. Accordingly, the UE 115 may perform configured grant transmissions (such as transmit uplinks signals 350) via the uplink configured grant occasion 410-*a* and the uplink configured grant occasion 410-*d* and may refrain from monitoring the non-serving cell SSB occasion 405-*a* and the non-serving cell SSB occasion 405-*d* for non-serving cell SSBs 355. Such a configured grant transmission may be referred to or illustrated as a CG Tx in FIG. 4.

In scenarios in which the non-serving cell SSB occasion 405-*b* and the non-serving cell SSB occasion 405-*c* are indicated for measurement at the UE 115, the UE 115 may deprioritize the uplink configured grant occasion 410-*b* and the uplink configured grant occasion 410-*c* and may instead prioritize the non-serving cell SSB occasion 405-*b* and the non-serving cell SSB occasion 405-*c*. Accordingly, the UE 115 may refrain from performing configured grant transmissions using the uplink configured grant occasion 410-*b* and the uplink configured grant occasion 410-*c* and may instead monitor the non-serving cell SSB occasion 405-*b* and the non-serving cell SSB occasion 405-*c* for non-serving cell SSBs 355.

Figure 5:
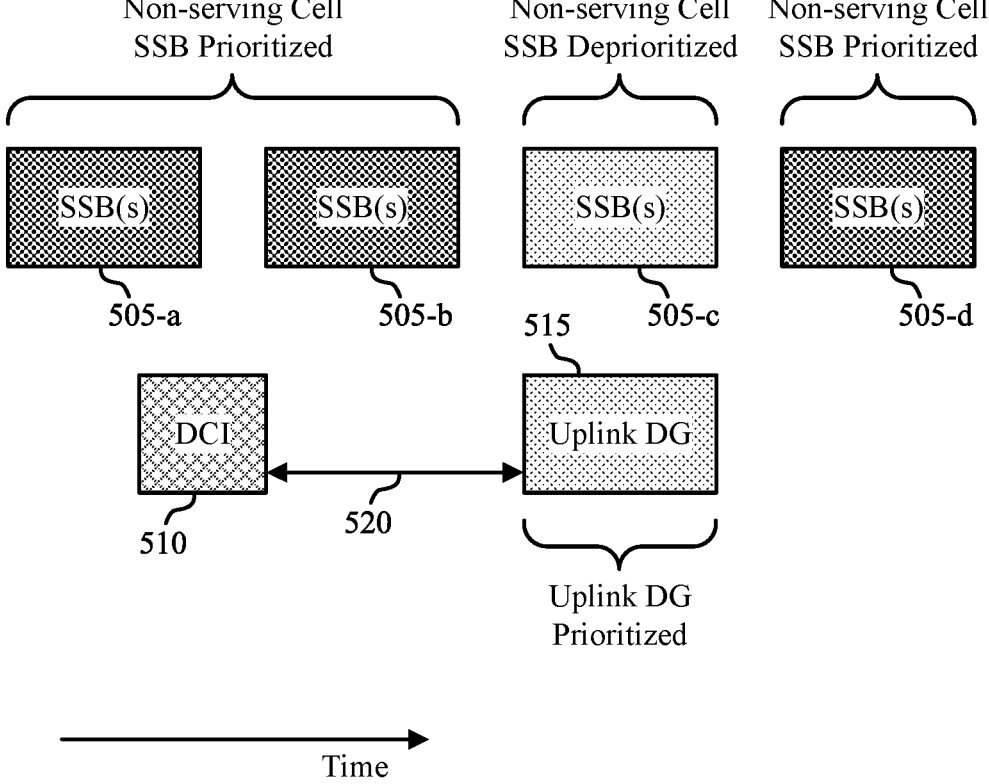

FIG. 5 shows an example prioritization rule 500 that supports multiplexing and prioritization techniques for uplink signaling and non-serving cell synchronization signals. The prioritization rule 500 may implement or be implemented to realize aspects of the wireless communications system 100, the network architecture 200, the signaling diagram 300, or the prioritization rule 400. For example, the prioritization rule 500 may be an example of the prioritization rule 360 as illustrated by and described with reference to FIG. 3. Accordingly, a UE 115 and a network entity 105 may use the prioritization rule 500 to enable uplink multiplexing with downlink non-serving cell SSBs, which may support full-duplex operation at the network entity 105 and provide greater flexibility at the UE 115. The UE 115 as described with reference to FIG. 5 may be an example of a UE 115, a UE 115-*a*, or a UE 115-*b* as illustrated by and described with reference to FIGS. 1-4. The network entity 105 as described with reference to FIG. 5 may be an example of a network entity 105 or a network entity 105-*a* as illustrated by and described with reference to FIGS. 1-4.

In accordance with the prioritization rule 500, the UE 115 may prioritize between non-serving cell SSB occasions 505 (which may generally refer to any one or more of a non-serving cell SSB occasion 505-*a*, a non-serving cell SSB occasion 505-*b*, a non-serving cell SSB occasion 505-*c*, or a non-serving cell SSB occasion 505-*d*) and an uplink dynamic grant occasion 515. As illustrated by FIG. 5, the non-serving cell SSB occasion 505-*c* may at least partially overlap with the uplink dynamic grant occasion 515. The overlap may be at least a one symbol overlap. As such, the prioritization rule 500 may be indicated, defined, or configured (such as in accordance with a network specification) for downlink non-serving cell SSB transmissions and configured or dynamic uplink transmissions when such transmissions are scheduled for a same symbol.

In some implementations, and as illustrated by the prioritization rule 500, the network entity 105 may transmit a DCI message 510 that schedules the uplink dynamic grant occasion 515. In some aspects, the DCI message 510 may additionally indicate a scheduling offset 520 between the DCI message 510 and the uplink dynamic grant occasion 515. The network entity 105 may configure and indicate a duration of the scheduling offset 520 in accordance with or using a priority of an uplink signal 350 to be transmitted via the uplink dynamic grant occasion 515. As such, a duration of the scheduling offset 520 may relate to or correlate with a priority of the uplink dynamic grant occasion 515 and, in some implementations, the UE 115 may employ the prioritization rule 500 to prioritize between the non-serving cell SSB occasion 505-*c* and the uplink dynamic grant occasion 515 in accordance with the duration of the scheduling offset 520.

In some aspects, a relatively longer scheduling offset 520 may indicate or correspond to a relatively higher priority and a relatively shorter scheduling offset 520 may indicate or correspond to a relatively lower priority. In other words, a relatively longer scheduling offset 520 may indicate that an uplink signal 350 scheduled for the uplink dynamic grant occasion 515 is relatively higher priority traffic. As such, the prioritization rule 500 may include a reference to a threshold duration, which may be referred to as a K2 value, and the UE 115 may prioritize one of the non-serving cell SSB occasion 505-*c* or the uplink dynamic grant occasion 515 depending on whether the duration of the scheduling offset 520 satisfies the threshold duration. For example, if the duration of the scheduling offset 520 satisfies (such as is greater than or equal to) the threshold duration, the UE 115 may prioritize the uplink dynamic grant occasion 515 and transmit an uplink signal 350 via the uplink dynamic grant occasion 515. In such examples, and as illustrated by FIG. 5, the UE 115 may prioritize the uplink dynamic grant occasion 515 deprioritize the non-serving cell SSB occasion 505-*c*. As also illustrated by FIG. 5, the UE 115 may prioritize the non-serving cell SSB occasion 505-*a*, the non-serving cell SSB occasion 505-*b*, and the non-serving cell SSB occasion 505-*d* (as a result of a lack of any overlapping or conflicting uplink signals 350).

Figure 6:
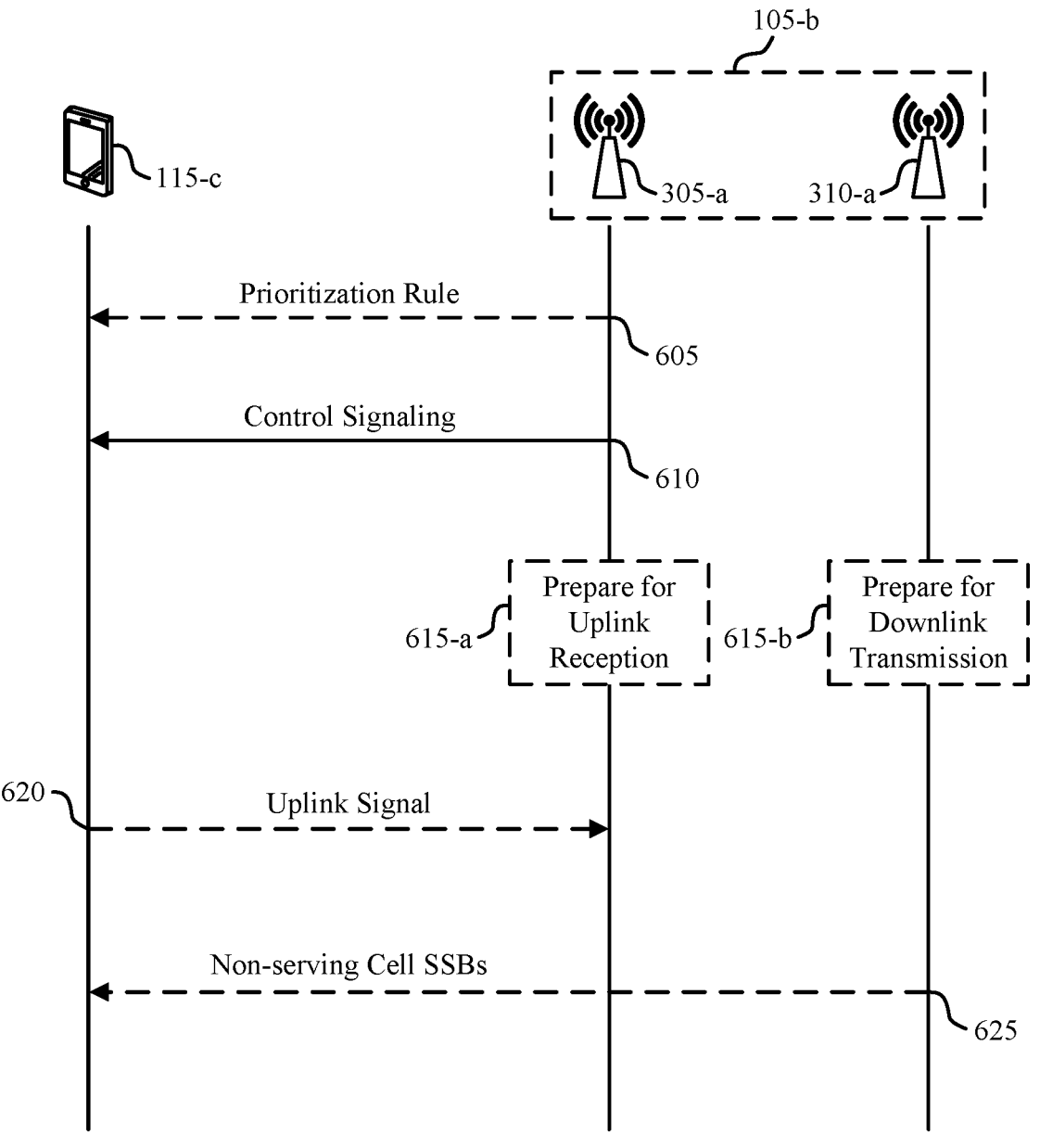
FIG. 6 shows an example process flow that supports multiplexing and prioritization techniques for uplink signaling and non-serving cell synchronization signals.

FIG. 6 shows an example process flow 600 that supports multiplexing and prioritization techniques for uplink signaling and non-serving cell synchronization signals. The process flow 600 may implement or be implemented to realize aspects of the wireless communications system 100, the network architecture 200, the signaling diagram 300, the prioritization rule 400, or the prioritization rule 500. For example, the process flow 600 illustrates communication between a UE 115-*c* and a network entity 105-*b* via a TRP 305-*a* and a TRP 310-*a*. The UE 115-*c* may be an example of a UE 115, a UE 115-*a*, or a UE 115-*b* as illustrated by and described with reference to FIGS. 1-5. The network entity 105-*b* may be an example of a network entity 105 or a network entity 105-*a* as illustrated by and described with reference to FIGS. 1-5. The TRP 305-*a* and the TRP 310-*a* may be examples of TRPs, such as a TRP 305 and a TRP 310, as illustrated by and described with reference to FIGS. 1-5. In some deployment scenarios (such as an inter-cell mTRP deployment), the TRP 305-*a* may be associated with a serving cell for the UE 115-*c* and the TRP 310-*a* may be associated with a non-serving cell for the UE 115-*c*.

In the following description of the process flow 600, the operations may be performed (such as reported or provided) in a different order than the order shown, or the operations performed by the example devices may be performed in different orders or at different times. For example, specific operations also may be left out of the process flow 600, or other operations may be added to the process flow 600. Further, although some operations or signaling may be shown to occur at different times for discussion purposes, these operations may actually occur at the same time.

At 605, the network entity 105-*b* may transmit, to the UE 115-*c* via the TRP 305-*a*, information associated with a prioritization (such as a prioritization rule 360) at the UE 115-*c* between non-serving cell SSBs (such as non-serving cell SSBs 355) and an uplink signal (such as an uplink signal 350). Additionally, or alternatively, the information associated with the prioritization may be configured at the UE 115-*c* in accordance with a network specification or may be independently selected or generated at the UE 115-*c*.

At 610, the network entity 105 may transmit, to the UE 115-*c* via the TRP 305-*a*, control signaling that indicates a first set of resources associated with an uplink signal (such as an uplink signal 350) and a second set of resources associated with an SSB that corresponds to a non-serving cell. In some implementations, the first set of resources may at least partially overlap in time with the second set of resources (such that there may be at least a one symbol duration overlap between the first set of resources and the second set of resources). As described herein, such an SSB that corresponds to a non-serving cell may be equivalently referred to as or understood as a non-serving cell SSB (such as a non-serving cell SSB 355). The control signaling may include one or more RRC information elements, one or more MAC-CEs, or one or more DCI messages, or any combination thereof.

At 615-*a*, the network entity 105-*b* may prepare, at the TRP 305-*a*, for uplink reception (of the uplink signal). At 615-*b*, the network entity 105-*b* may prepare, at the TRP 310-*a*, for downlink transmission (of one or more non-serving cell SSBs). For example, in accordance with the prioritization to be applied at the UE 115-*c*, the network entity 105-*b* may prepare for one or both of uplink reception and downlink transmission in accordance with whether the network entity 105-*b* is aware of the prioritization rule to be used by the UE 115-*c*.

The UE 115-*c* may communicate with the network entity 105-*b* in accordance with a prioritization of one of the uplink signal or the non-serving cell SSB. For example, the UE 115-*c* may ascertain, select, identify, or otherwise determine which of the uplink signal or the non-serving cell SSB to prioritize and may communicate with the network entity 105-*b* by transmitting the uplink signal or by monitoring for the non-serving cell SSB.

At 620, for example, the UE 115-*c* may transmit the uplink signal using the first set of resources (such as a complete set of allocated resources) in accordance with prioritizing the uplink signal over the non-serving cell SSB. The UE 115-*c* may prioritize the uplink signal over the non-serving cell SSB if a time duration of a scheduling offset associated with the uplink signal satisfies (such as is greater than or equal to) a threshold time duration or if the non-serving cell SSB is not indicated for measurement by the UE 115-*c*, or if both. In implementations in which the UE 115-*c* prioritizes the uplink signal, the UE 115-*c* may monitor for the non-serving cell SSB using a subset of the second set of resources that does not overlap in time with the first set of resources (such as a partial set of allocated resources), may refrain from monitoring for the non-serving cell SSB altogether, or may defer monitoring for the non-serving cell SSB to a future occasion.

At 625, the UE 115-*c* may alternatively monitor for the non-serving cell SSB using the second set of resources (such as a complete set of allocated resources) in accordance with prioritizing the non-serving cell SSB over the uplink signal. The UE 115-*c* may prioritize the non-serving cell SSB if a time duration of a scheduling offset associated with the uplink signal fails to satisfy (such as is less than) a threshold time duration or if the non-serving cell SSB is indicated for measurement by the UE 115-*c*, or if both. In implementations in which the UE 115-*c* prioritizes the non-serving cell SSB, the UE 115-*c* may transmit the uplink signal (or a portion of the uplink signal) using a subset of the first set of resources that does not overlap in time with the second set of resources (such as a partial set of allocated resources), may refrain from transmitting the uplink signal altogether, or may defer transmission of the uplink signal to a future occasion.

As such, the UE 115-*c* may support operation in a full-duplex mode at the network entity 105-*b* in accordance with receiving the control signaling that indicates the first set of resources and the second set of resources that at least partially overlap in time and may operate in a half-duplex mode in accordance with the prioritization. For example, the network entity 105-*b* and the UE 115-*c* may relax a scheduling constraint associated with uplink signals and non-serving cell SSBs, which may enable the UE 115-*c* to leverage the full-duplex capability of the network entity 105-*b* and prioritize one of the uplink signal or the non-serving cell SSBs in accordance with a prioritization rule.

Figure 7:
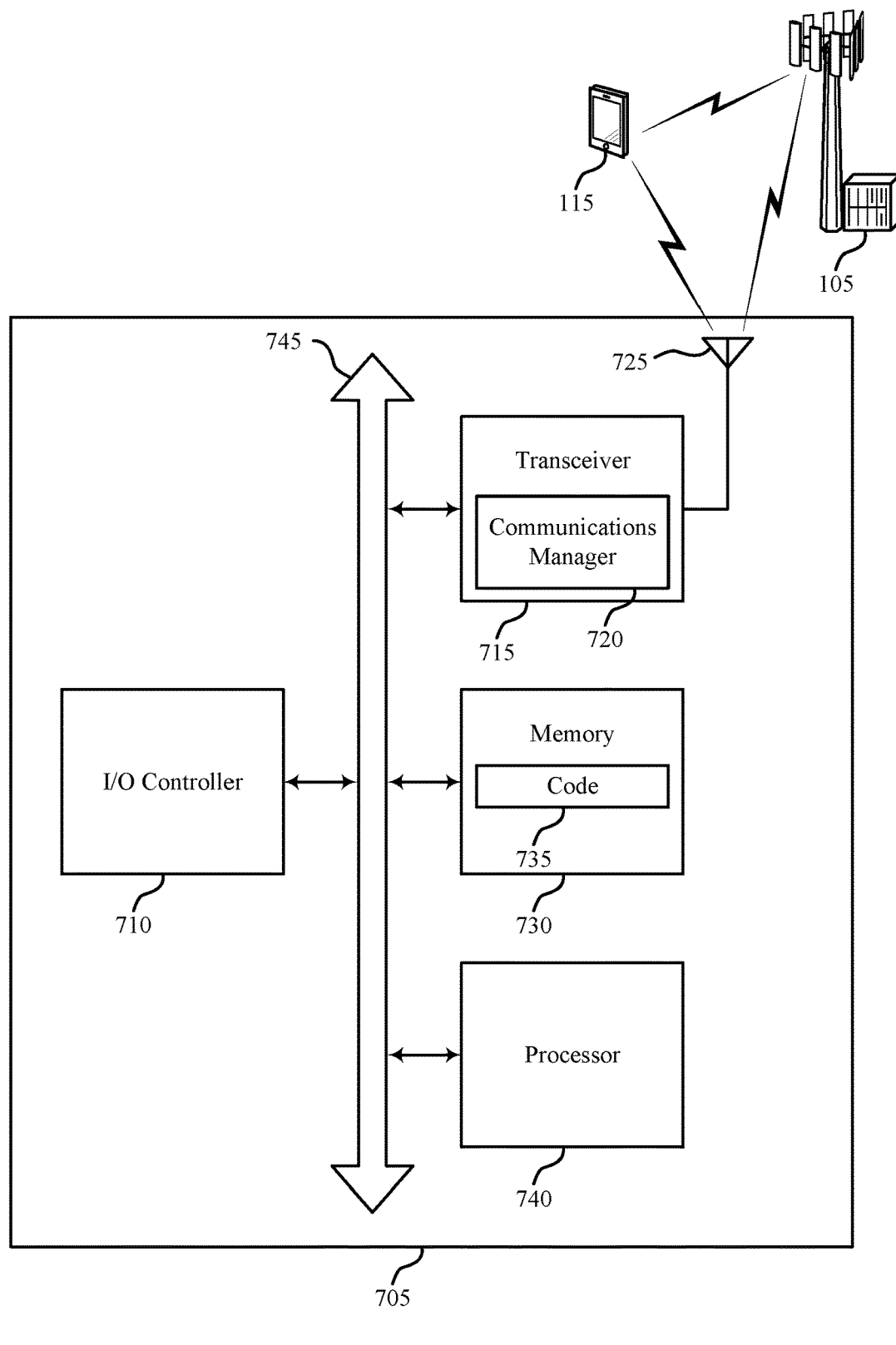
FIGS. 7 and 8 show block diagrams of example devices that support multiplexing and prioritization techniques for uplink signaling and non-serving cell synchronization signals.

FIG. 7 shows a block diagram 700 of an example device 705 that supports multiplexing and prioritization techniques for uplink signaling and non-serving cell synchronization signals. The device 705 may communicate (such as wirelessly) with one or more network entities (such as one or more components of one or more network entities 105), one or more UEs 115, or any combination thereof. The device

705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (such as operatively, communicatively, functionally, electronically, electrically) via one or more buses (such as a bus 745).

The I/O controller 710 may manage input and output signals for the device 705. The I/O controller 710 also may manage peripherals not integrated into the device 705. In some implementations, the I/O controller 710 may represent a physical connection or port to an external peripheral. In some implementations, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some implementations, the I/O controller 710 may be implemented as part of a processor or processing system, such as the processor 740. In some implementations, a user may interact with the device 705 via the I/O controller 710 or via hardware components controlled by the I/O controller 710.

In some implementations, the device 705 may include a single antenna 725. However, in some other implementations, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 also may include a modem to modulate the packets, to provide the modulated packets to one or more antennas 725 for transmission, and to demodulate packets received from the one or more antennas 725.

In some implementations, the transceiver 715 may include one or more interfaces, such as one or more interfaces coupled with the one or more antennas 725 that are configured to support various receiving or obtaining operations, or one or more interfaces coupled with the one or more antennas 725 that are configured to support various transmitting or outputting operations, or a combination thereof. In some implementations, the transceiver 715 may include or be configured for coupling with one or more processors or memory components that are operable to perform or support operations based on received or obtained information or signals, or to generate information or other signals for transmission or other outputting, or any combination thereof. In some implementations, the transceiver 715, or the transceiver 715 and the one or more antennas 725, or the transceiver 715 and the one or more antennas 725 and one or more processors or memory components (such as the processor 740, or the memory 730, or both), may be included in a chip or chip assembly that is installed in the device 705.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some implementations, the code 735 may not be directly executable by the processor 740 but may cause a computer (such as when compiled and executed) to perform functions described herein. In some implementations, the memory 730 may contain, among other things, a basic I/O system (BIOS) which may control basic hardware or software operation such as the interaction with peripheral components or devices.

The processor 740 may include an intelligent hardware device (such as a general-purpose processor, a digital signal processor (DSP), an application-specific integrated circuit (ASIC), a central processing unit (CPU), a field-programmable gate array (FPGA), a microcontroller, a programmable logic device, discrete gate or transistor logic, a discrete hardware component, or any combination thereof). In some implementations, the processor 740 may be configured to operate a memory array using a memory controller. In some other implementations, a memory controller may be integrated into the processor 740. The processor 740 may be configured to execute computer-readable instructions stored in a memory (such as the memory 730) to cause the device 705 to perform various functions (such as functions or tasks supporting multiplexing and prioritization techniques for uplink signaling and non-serving cell synchronization signals). For example, the device 705 or a component of the device 705 may include a processor 740 and memory 730 coupled with the processor 740, the processor 740 and memory 730 configured to perform various functions described herein. The processor 740 may be an example of a cloud-computing platform (such as one or more physical nodes and supporting software such as operating systems, virtual machines, or container instances) that may host the functions (such as by executing code 735) to perform the functions of the device 705. The processor 740 may be any one or more suitable processors capable of executing scripts or instructions of one or more software programs stored in the device 705 (such as within the memory 730).

In some implementations, the processor 740 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705, such as the processor 740, or the transceiver 715, or the communications manager 720, or other components or combinations of components of the device 705. The processing system of the device 705 may interface with other components of the device 705, and may process information received from other components (such as inputs or signals) or output information to other components. For example, a chip or modem of the device 705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 705 may transmit information output from the chip or modem. Additionally, or alternatively, in some implementations, the one or more interfaces may refer to an interface between the processing system of the chip or modem and a receiver, such that the device 705 may obtain information or signal inputs, and the information may be passed to the processing system. A person having ordinary skill in the art will readily recognize that a first interface also may obtain information or signal inputs, and a second interface also may output information or signal outputs.

The communications manager 720 may support wireless communications at a UE in accordance with examples as disclosed herein. For example, the communications manager 720 may be configured as or otherwise support a means for receiving control signaling that indicates a first set of resources associated with an uplink signal and a second set of resources associated with an SSB that corresponds to a non-serving cell, where the first set of resources at least partially overlaps in time with the second set of resources. The communications manager 720 may be configured as or otherwise support a means for communicating with a network entity in accordance with a prioritization of one of the uplink signal or the SSB.

In some implementations, to support receiving the control signaling, the communications manager 720 may be configured as or otherwise support a means for receiving an indication of a scheduling offset associated with the uplink signal, where the prioritization of the one of the uplink signal or the SSB is associated with a time duration of the scheduling offset.

In some implementations, to support communicating with the network entity in accordance with the prioritization, the communications manager 720 may be configured as or otherwise support a means for transmitting the uplink signal using the first set of resources in accordance with prioritizing the uplink signal over the SSB if the time duration of the scheduling offset satisfies a threshold time duration. In some implementations, to support communicating with the network entity in accordance with the prioritization, the communications manager 720 may be configured as or otherwise support a means for monitoring the second set of resources in accordance with prioritizing the SSB over the uplink signal if the time duration of the scheduling offset fails to satisfy the threshold time duration.

In some implementations, the time duration of the scheduling offset is associated with a priority of the uplink signal. In some implementations, the time duration satisfying a threshold time duration indicates that the uplink signal is associated with a relatively higher priority than the SSB.

In some implementations, to support receiving the control signaling, the communications manager 720 may be configured as or otherwise support a means for receiving an indication of the second set of resources associated with the SSB, where the prioritization of the one of the uplink signal or the SSB is associated with a type of the indication.

In some implementations, to support communicating with the network entity in accordance with the prioritization, the communications manager 720 may be configured as or otherwise support a means for transmitting the uplink signal using the first set of resources in accordance with prioritizing the uplink signal over the SSB if the type of the indication is associated with an indicated TCI state or a neighbor cell SSB information element. In some implementations, to support communicating with the network entity in accordance with the prioritization, the communications manager 720 may be configured as or otherwise support a means for monitoring the second set of resources in accordance with prioritizing the SSB over the uplink signal if the type of the indication is associated with a measurement at the UE.

In some implementations, the communications manager 720 may be configured as or otherwise support a means for receiving information associated with the prioritization, where communicating with the network entity in accordance with the prioritization is associated with receiving the information associated with the prioritization.

In some implementations, information associated with the prioritization is configured at the UE in accordance with a network specification.

In some implementations, to support communicating with the network entity in accordance with the prioritization, the communications manager 720 may be configured as or otherwise support a means for using a complete set of allocated resources for one of the uplink signal or the SSB that is associated with a relatively higher priority. In some implementations, to support communicating with the network entity in accordance with the prioritization, the communications manager 720 may be configured as or otherwise support a means for using a partial set of allocated resources for another of the uplink signal or the SSB that is associated with a relatively lower priority, where the partial set of allocated resources is non-overlapping with the complete set of allocated resources.

In some implementations, to support communicating with the network entity in accordance with the prioritization, the communications manager 720 may be configured as or otherwise support a means for dropping one of the uplink signal or the SSB that is associated with a relatively lower priority than another of the uplink signal or the SSB.

In some implementations, to support communicating with the network entity in accordance with the prioritization, the communications manager 720 may be configured as or otherwise support a means for using a complete set of allocated resources for one of the uplink signal or the SSB that is associated with a relatively higher priority. In some implementations, to support communicating with the network entity in accordance with the prioritization, the communications manager 720 may be configured as or otherwise support a means for using a third set of resources for another of the uplink signal or the SSB that is associated with a relatively lower priority, where the third set of resources are non-overlapping with the complete set of allocated resources, and where the third set of resources is indicated by the network entity or a next available set of resources.

In some implementations, the network entity is associated with a first TRP associated with a serving cell for the UE and a second TRP associated with the non-serving cell. In some implementations, the uplink signal is associated with the first TRP and the SSB is associated with the second TRP.

In some implementations, the UE supports operation in a full-duplex mode at the network entity in accordance with receiving the control signaling that indicates the first set of resources and the second set of resources that at least partially overlap in time. In some implementations, the UE operates in a half-duplex mode in accordance with the prioritization.

In some implementations, the first set of resources at least partially overlapping in time with the second set of resources triggers a use of the prioritization.

In some implementations, the communications manager 720 may be configured to perform various operations (such as receiving, monitoring, transmitting) using or otherwise in cooperation with the transceiver 715, the one or more antennas 725, or any combination thereof. Although the communications manager 720 is illustrated as a component of the transceiver 715, in some implementations, one or more functions described with reference to the communications manager 720 may be supported by or performed by the transceiver 715, the processor 740, the memory 730, the code 735, or any combination thereof. For example, the code 735 may include instructions executable by the processor 740 to cause the device 705 to perform various aspects of multiplexing and prioritization techniques for uplink signaling and non-serving cell synchronization signals as described herein, or the processor 740 and the memory 730 may be otherwise configured to perform or support such operations.

Figure 8:

FIG. 8 shows a block diagram 800 of an example device 805 that supports multiplexing and prioritization techniques for uplink signaling and non-serving cell synchronization signals. The device 805 may communicate with one or more network entities (such as one or more components of one or more network entities 105), one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (such as operatively, communicatively, functionally, electronically, electrically) via one or more buses (such as a bus 840).

The transceiver 810 may support bi-directional communications via wired links, wireless links, or both as described herein. In some implementations, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some implementations, the device 805 may include one or more antennas 815, which may be capable of transmitting or receiving wireless transmissions (such as concurrently). The transceiver 810 also may include a modem to modulate signals, to provide the modulated signals for transmission (such as by one or more antennas 815, by a wired transmitter), to receive modulated signals (such as from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof.

In some implementations, the transceiver 810 may include or be configured for coupling with one or more processors or memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or memory components (such as the processor 835, or the memory 825, or both), may be included in a chip or chip assembly that is installed in the device 805. In some implementations, the transceiver may be operable to support communications via one or more communications links (such as a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some implementations, the code 830 may not be directly executable by the processor 835 but may cause a computer (such as when compiled and executed) to perform functions described herein. In some implementations, the memory 825 may contain, among other things, a BIOS which may control basic hardware or software operation such as the interaction with peripheral components or devices.

The processor 835 may include an intelligent hardware device (such as a general-purpose processor, a DSP, an ASIC, a CPU, an FPGA, a microcontroller, a programmable logic device, discrete gate or transistor logic, a discrete hardware component, or any combination thereof). In some implementations, the processor 835 may be configured to operate a memory array using a memory controller. In some other implementations, a memory controller may be integrated into the processor 835. The processor 835 may be configured to execute computer-readable instructions stored in a memory (such as the memory 825) to cause the device 805 to perform various functions (such as functions or tasks supporting multiplexing and prioritization techniques for uplink signaling and non-serving cell synchronization signals). For example, the device 805 or a component of the device 805 may include a processor 835 and memory 825 coupled with the processor 835, the processor 835 and memory 825 configured to perform various functions described herein. The processor 835 may be an example of a cloud-computing platform (such as one or more physical nodes and supporting software such as operating systems, virtual machines, or container instances) that may host the functions (such as by executing code 830) to perform the functions of the device 805. The processor 835 may be any one or more suitable processors capable of executing scripts or instructions of one or more software programs stored in the device 805 (such as within the memory 825). In some implementations, the processor 835 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 835, or the transceiver 810, or the communications manager 820, or other components or combinations of components of the device 805.

The processing system of the device 805 may interface with other components of the device 805, and may process information received from other components (such as inputs or signals) or output information to other components. For example, a chip or modem of the device 805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system. A person having ordinary skill in the art will readily recognize that a first interface also may obtain information or signal inputs, and a second interface also may output information or signal outputs.

In some implementations, a bus 840 may support communications of (such as within) a protocol layer of a protocol stack. In some implementations, a bus 840 may support communications associated with a logical channel of a protocol stack (such as between protocol layers of a protocol stack), which may include communications performed within a component of the device 805, or between different components of the device 805 that may be co-located or located in different locations (such as where the device 805 may refer to a system in which one or more of the communications manager 820, the transceiver 810, the memory 825, the code 830, and the processor 835 may be located in one of the different components or divided between different components).

In some implementations, the communications manager 820 may manage aspects of communications with a core network 130 (such as via one or more wired or wireless backhaul links). For example, the communications manager 820 may manage the transfer of data communications for client devices, such as one or more UEs 115. In some implementations, the communications manager 820 may manage communications with other network entities 105, and may include a controller or scheduler for controlling communications with UEs 115 in cooperation with other network entities 105. In some implementations, the communications manager 820 may support an X2 interface within an LTE/LTE-A wireless communications network technology to provide communication between network entities 105.

The communications manager 820 may support wireless communications at a network entity in accordance with examples as disclosed herein. For example, the communications manager 820 may be configured as or otherwise support a means for transmitting control signaling that indicates a first set of resources associated with an uplink signal and a second set of resources associated with an SSB that corresponds to a non-serving cell of a UE, where the first set of resources at least partially overlaps in time with the second set of resources. The communications manager 820 may be configured as or otherwise support a means for communicating with the UE in accordance with a prioritization of one of the uplink signal or the SSB.

In some implementations, to support transmitting the control signaling, the communications manager 820 may be configured as or otherwise support a means for transmitting an indication of a scheduling offset associated with the uplink signal, where the prioritization of the one of the uplink signal or the SSB is associated with a time duration of the scheduling offset.

In some implementations, to support communicating with the UE in accordance with the prioritization, the communications manager 820 may be configured as or otherwise support a means for receiving the uplink signal using the first set of resources in accordance with prioritizing the uplink signal over the SSB if the time duration of the scheduling offset satisfies a threshold time duration. In some implementations, to support communicating with the UE in accordance with the prioritization, the communications manager 820 may be configured as or otherwise support a means for transmitting the SSB using the second set of resources in accordance with prioritizing the SSB over the uplink signal if the time duration of the scheduling offset fails to satisfy the threshold time duration.

In some implementations, the time duration of the scheduling offset is associated with a priority of the uplink signal. In some implementations, the time duration satisfying a threshold time duration indicates that the uplink signal is associated with a relatively higher priority than the SSB.

In some implementations, to support transmitting the control signaling, the communications manager 820 may be configured as or otherwise support a means for transmitting an indication of the second set of resources associated with the SSB, where the prioritization of the one of the uplink signal or the SSB is associated with a type of the indication.

In some implementations, to support communicating with the UE in accordance with the prioritization, the communications manager 820 may be configured as or otherwise support a means for receiving the uplink signal using the first set of resources in accordance with prioritizing the uplink signal over the SSB if the type of the indication is associated with an indicated TCI state or a neighbor cell SSB information element. In some implementations, to support communicating with the UE in accordance with the prioritization, the communications manager 820 may be configured as or otherwise support a means for transmitting the SSB using the second set of resources in accordance with prioritizing the SSB over the uplink signal if the type of the indication is associated with a measurement at the UE.

In some implementations, the communications manager 820 may be configured as or otherwise support a means for transmitting information associated with the prioritization, where communicating with the UE in accordance with the prioritization is associated with transmitting the information associated with the prioritization.

In some implementations, information associated with the prioritization is configured at the network entity in accordance with a network specification.

In some implementations, to support communicating with the UE in accordance with the prioritization, the communications manager 820 may be configured as or otherwise support a means for using a complete set of allocated resources for one of the uplink signal or the SSB that is associated with a relatively higher priority. In some implementations, to support communicating with the UE in accordance with the prioritization, the communications manager 820 may be configured as or otherwise support a means for using a partial set of allocated resources for another of the uplink signal or the SSB that is associated with a relatively lower priority, where the partial set of allocated resources is non-overlapping with the complete set of allocated resources.

In some implementations, to support communicating with the UE in accordance with the prioritization, the communications manager 820 may be configured as or otherwise support a means for dropping one of the uplink signal or the SSB that is associated with a relatively lower priority than another of the uplink signal or the SSB.

In some implementations, to support communicating with the UE in accordance with the prioritization, the communications manager 820 may be configured as or otherwise support a means for using a complete set of allocated resources for one of the uplink signal or the SSB that is associated with a relatively higher priority. In some implementations, to support communicating with the UE in accordance with the prioritization, the communications manager 820 may be configured as or otherwise support a means for using a third set of resources for another of the uplink signal or the SSB that is associated with a relatively lower priority, where the third set of resources are non-overlapping with the complete set of allocated resources, and where the third set of resources is indicated by the network entity or a next available set of resources.

In some implementations, the network entity is associated with a first TRP associated with a serving cell for the UE and a second TRP associated with the non-serving cell. In some implementations, the uplink signal is associated with the first TRP and the SSB is associated with the second TRP.

In some implementations, the network entity operates in a full-duplex mode in accordance with transmitting the control signaling that indicates the first set of resources and the second set of resources that at least partially overlap in time. In some implementations, the network entity supports operation in a half-duplex mode at the UE in accordance with the prioritization.

In some implementations, the first set of resources at least partially overlapping in time with the second set of resources triggers a use of the prioritization.

In some implementations, the communications manager 820 may be configured to perform various operations (such as receiving, obtaining, monitoring, outputting, transmitting) using or otherwise in cooperation with the transceiver 810, the one or more antennas 815 (such as where applicable), or any combination thereof. Although the communications manager 820 is illustrated as a separate component, in some examples, one or more functions described with reference to the communications manager 820 may be supported by or performed by the transceiver 810, the processor 835, the memory 825, the code 830, or any combination thereof. For example, the code 830 may include instructions executable by the processor 835 to cause the device 805 to perform various aspects of multiplexing and prioritization techniques for uplink signaling and non-serving cell synchronization signals as described herein, or the processor 835 and the memory 825 may be otherwise configured to perform or support such operations.

FIG. 9 shows a flowchart illustrating an example method 900 that supports multiplexing and prioritization techniques for uplink signaling and non-serving cell synchronization signals. The operations of the method 900 may be implemented by a UE or its components as described herein. For example, the operations of the method 900 may be performed by a UE 115 as described with reference to FIGS. 1-7. In some implementations, a UE may execute a set of instructions to control the functional elements of the UE to perform the described functions. Additionally, or alternatively, the UE may perform aspects of the described functions using special-purpose hardware.

At 905, the method may include receiving control signaling that indicates a first set of resources associated with an uplink signal and a second set of resources associated with an SSB that corresponds to a non-serving cell, where the first set of resources at least partially overlaps in time with the second set of resources. The operations of 905 may be performed in accordance with examples as disclosed herein.

At 910, the method may include communicating with a network entity in accordance with a prioritization of one of the uplink signal or the SSB. The operations of 910 may be performed in accordance with examples as disclosed herein.

FIG. 10 shows a flowchart illustrating an example method 1000 that supports multiplexing and prioritization techniques for uplink signaling and non-serving cell synchronization signals. The operations of the method 1000 may be implemented by a network entity or its components as described herein. For example, the operations of the method 1000 may be performed by a network entity as described with reference to FIGS. 1-6 and 8. In some implementations, a network entity may execute a set of instructions to control the functional elements of the network entity to perform the described functions. Additionally, or alternatively, the network entity may perform aspects of the described functions using special-purpose hardware.

At 1005, the method may include transmitting control signaling that indicates a first set of resources associated with an uplink signal and a second set of resources associated with an SSB that corresponds to a non-serving cell of a UE, where the first set of resources at least partially overlaps in time with the second set of resources. The operations of 1005 may be performed in accordance with examples as disclosed herein.

At 1010, the method may include communicating with the UE in accordance with a prioritization of one of the uplink signal or the SSB. The operations of 1010 may be performed in accordance with examples as disclosed herein.

The following provides an overview of some aspects of the present disclosure:

Aspect 1: A method for wireless communications at a UE, including: receiving control signaling that indicates a first set of resources associated with an uplink signal and a second set of resources associated with an SSB that corresponds to a non-serving cell, where the first set of resources at least partially overlaps in time with the second set of resources; and communicating with a network entity in accordance with a prioritization of one of the uplink signal or the SSB.

Aspect 2: The method of aspect 1, where receiving the control signaling includes: receiving an indication of a scheduling offset associated with the uplink signal, where the prioritization of the one of the uplink signal or the SSB is associated with a time duration of the scheduling offset.

Aspect 3: The method of aspect 2, where communicating with the network entity in accordance with the prioritization includes: transmitting the uplink signal using the first set of resources in accordance with prioritizing the uplink signal over the SSB if the time duration of the scheduling offset satisfies a threshold time duration; and monitoring the second set of resources in accordance with prioritizing the SSB over the uplink signal if the time duration of the scheduling offset fails to satisfy the threshold time duration.

Aspect 4: The method of any of aspects 2-3, where the time duration of the scheduling offset is associated with a priority of the uplink signal, and the time duration satisfying a threshold time duration indicates that the uplink signal is associated with a relatively higher priority than the SSB.

Aspect 5: The method of any of aspects 1-4, where receiving the control signaling includes: receiving an indication of the second set of resources associated with the SSB, where the prioritization of the one of the uplink signal or the SSB is associated with a type of the indication.

Aspect 6: The method of aspect 5, where communicating with the network entity in accordance with the prioritization includes: transmitting the uplink signal using the first set of resources in accordance with prioritizing the uplink signal over the SSB if the type of the indication is associated with an indicated TCI state or a neighbor cell SSB information element; and monitoring the second set of resources in accordance with prioritizing the SSB over the uplink signal if the type of the indication is associated with a measurement at the UE.

Aspect 7: The method of any of aspects 1-6, further including: receiving information associated with the prioritization, where communicating with the network entity in accordance with the prioritization is associated with receiving the information associated with the prioritization.

Aspect 8: The method of any of aspects 1-7, where information associated with the prioritization is configured at the UE in accordance with a network specification.

Aspect 9: The method of any of aspects 1-8, where communicating with the network entity in accordance with the prioritization includes: using a complete set of allocated resources for one of the uplink signal or the SSB that is associated with a relatively higher priority; and using a partial set of allocated resources for another of the uplink signal or the SSB that is associated with a relatively lower priority, where the partial set of allocated resources is non-overlapping with the complete set of allocated resources.

Aspect 10: The method of any of aspects 1-8, where communicating with the network entity in accordance with the prioritization includes: dropping one of the uplink signal or the SSB that is associated with a relatively lower priority than another of the uplink signal or the SSB.

Aspect 11: The method of any of aspects 1-8, where communicating with the network entity in accordance with the prioritization includes: using a complete set of allocated resources for one of the uplink signal or the SSB that is associated with a relatively higher priority; and using a third set of resources for another of the uplink signal or the SSB that is associated with a relatively lower priority, where the third set of resources are non-overlapping with the complete set of allocated resources, and where the third set of resources is indicated by the network entity or a next available set of resources.

Aspect 12: The method of any of aspects 1-11, where the network entity is associated with a first TRP associated with a serving cell for the UE and a second TRP associated with the non-serving cell, and the uplink signal is associated with the first TRP and the SSB is associated with the second TRP.

Aspect 13: The method of any of aspects 1-12, where the UE supports operation in a full-duplex mode at the network entity in accordance with receiving the control signaling that indicates the first set of resources and the second set of resources that at least partially overlap in time, and the UE operates in a half-duplex mode in accordance with the prioritization.

Aspect 14: The method of any of aspects 1-13, where the first set of resources at least partially overlapping in time with the second set of resources triggers a use of the prioritization.

Aspect 15: A method for wireless communications at a network entity, including: transmitting control signaling that indicates a first set of resources associated with an uplink signal and a second set of resources associated with an SSB that correspond to a non-serving cell of a UE, where the first set of resources at least partially overlaps in time with the second set of resources; and communicating with the UE in accordance with a prioritization of one of the uplink signal or the SSB.

Aspect 16: The method of aspect 15, where transmitting the control signaling includes: transmitting an indication of a scheduling offset associated with the uplink signal, where the prioritization of the one of the uplink signal or the SSB is associated with a time duration of the scheduling offset.

Aspect 17: The method of aspect 16, where communicating with the UE in accordance with the prioritization includes: receiving the uplink signal using the first set of resources in accordance with prioritizing the uplink signal over the SSB if the time duration of the scheduling offset satisfies a threshold time duration; and transmitting the SSB using the second set of resources in accordance with prioritizing the SSB over the uplink signal if the time duration of the scheduling offset fails to satisfy the threshold time duration.

Aspect 18: The method of any of aspects 16-17, where the time duration of the scheduling offset is associated with a priority of the uplink signal, and the time duration satisfying a threshold time duration indicates that the uplink signal is associated with a relatively higher priority than the SSB.

Aspect 19: The method of any of aspects 15-18, where transmitting the control signaling includes: transmitting an indication of the second set of resources associated with the SSB, where the prioritization of the one of the uplink signal or the SSB is associated with a type of the indication.

Aspect 20: The method of aspect 19, where communicating with the UE in accordance with the prioritization includes: receiving the uplink signal using the first set of resources in accordance with prioritizing the uplink signal over the SSB if the type of the indication is associated with an indicated TCI state or a neighbor cell SSB information element; and transmitting the SSB using the second set of resources in accordance with prioritizing the SSB over the uplink signal if the type of the indication is associated with a measurement at the UE.

Aspect 21: The method of any of aspects 15-20, further including: transmitting information associated with the prioritization, where communicating with the UE in accordance with the prioritization is associated with transmitting the information associated with the prioritization.

Aspect 22: The method of any of aspects 15-21, where information associated with the prioritization is configured at the network entity in accordance with a network specification.

Aspect 23: The method of any of aspects 15-22, where communicating with the UE in accordance with the prioritization includes: using a complete set of allocated resources for one of the uplink signal or the SSB that is associated with a relatively higher priority; and using a partial set of allocated resources for another of the uplink signal or the SSB that is associated with a relatively lower priority, where the partial set of allocated resources is non-overlapping with the complete set of allocated resources.

Aspect 24: The method of any of aspects 15-22, where communicating with the UE in accordance with the prioritization includes: dropping one of the uplink signal or the SSB that is associated with a relatively lower priority than another of the uplink signal or the SSB.

Aspect 25: The method of any of aspects 15-22, where communicating with the UE in accordance with the prioritization includes: using a complete set of allocated resources for one of the uplink signal or the SSB that is associated with a relatively higher priority; and using a third set of resources for another of the uplink signal or the SSB that is associated with a relatively lower priority, where the third set of resources are non-overlapping with the complete set of allocated resources, and where the third set of resources is indicated by the network entity or a next available set of resources.

Aspect 26: The method of any of aspects 15-25, where the network entity is associated with a first TRP associated with a serving cell for the UE and a second TRP associated with the non-serving cell, and the uplink signal is associated with the first TRP and the SSB is associated with the second TRP.

Aspect 27: The method of any of aspects 15-26, where the network entity operates in a full-duplex mode in accordance with transmitting the control signaling that indicates the first set of resources and the second set of resources that at least partially overlap in time, and the network entity supports operation in a half-duplex mode at the UE in accordance with the prioritization.

Aspect 28: The method of any of aspects 15-27, where the first set of resources at least partially overlapping in time with the second set of resources triggers a use of the prioritization.

Aspect 29: An apparatus for wireless communications at a UE, including: one or more interfaces configured to: obtain control signaling that indicates a first set of resources associated with an uplink signal and a second set of resources associated with an SSB that corresponds to a non-serving cell, where the first set of resources at least partially overlaps in time with the second set of resources; and communicate with a network entity in accordance with a prioritization of one of the uplink signal or the SSB.

Aspect 30: The apparatus of aspect 29, where, to obtain the control signaling, the one or more interfaces are further configured to: obtain an indication of a scheduling offset associated with the uplink signal, where the prioritization of the one of the uplink signal or the SSB is associated with a time duration of the scheduling offset.

Aspect 31: The apparatus of aspect 30, where, to communicate with the network entity in accordance with the prioritization, the one or more interfaces are further configured to: output the uplink signal using the first set of resources in accordance with prioritizing the uplink signal over the SSB if the time duration of the scheduling offset satisfies a threshold time duration; and monitor the second set of resources in accordance with prioritizing the SSB over the uplink signal if the time duration of the scheduling offset fails to satisfy the threshold time duration.

Aspect 32: The apparatus of any of aspects 30-31, where the time duration of the scheduling offset is associated with a priority of the uplink signal, and the time duration satisfying a threshold time duration indicates that the uplink signal is associated with a relatively higher priority than the SSB.

Aspect 33: The apparatus of any of aspects 29-32, where, to obtain the control signaling, the one or more interfaces are further configured to: obtain an indication of the second set of resources associated with the SSB, where the prioritization of the one of the uplink signal or the SSB is associated with a type of the indication.

Aspect 34: The apparatus of aspect 33, where, to communicate with the network entity in accordance with the prioritization, the one or more interfaces are further configured to: output the uplink signal using the first set of resources in accordance with prioritizing the uplink signal over the SSB if the type of the indication is associated with an indicated TCI state or a neighbor cell SSB information element; and monitor the second set of resources in accordance with prioritizing the SSB over the uplink signal if the type of the indication is associated with a measurement at the UE.

Aspect 35: The apparatus of any of aspects 29-34, where the one or more interfaces are further configured to: obtain information associated with the prioritization, where communicating with the network entity in accordance with the prioritization is associated with obtaining the information associated with the prioritization.

Aspect 36: The apparatus of any of aspects 29-35, where information associated with the prioritization is configured at the UE in accordance with a network specification.

Aspect 37: The apparatus of any of aspects 29-36, where, to communicate with the network entity in accordance with the prioritization, the one or more interfaces are further configured to: use a complete set of allocated resources for one of the uplink signal or the SSB that is associated with a relatively higher priority; and use a partial set of allocated resources for another of the uplink signal or the SSB that is associated with a relatively lower priority, where the partial set of allocated resources is non-overlapping with the complete set of allocated resources.

Aspect 38: The apparatus of any of aspects 29-36, where, to communicate with the network entity in accordance with the prioritization, the one or more interfaces are further configured to: drop one of the uplink signal or the SSB that is associated with a relatively lower priority than another of the uplink signal or the SSB.

Aspect 39: The apparatus of any of aspects 29-36, where, to communicate with the network entity in accordance with the prioritization, the one or more interfaces are further configured to: use a complete set of allocated resources for one of the uplink signal or the SSB that is associated with a relatively higher priority; and use a third set of resources for another of the uplink signal or the SSB that is associated with a relatively lower priority, where the third set of resources are non-overlapping with the complete set of allocated resources, and where the third set of resources is indicated by the network entity or a next available set of resources.

Aspect 40: The apparatus of any of aspects 29-39, where the network entity is associated with a first TRP associated with a serving cell for the UE and a second TRP associated with the non-serving cell, and the uplink signal is associated with the first TRP and the SSB is associated with the second TRP.

Aspect 41: The apparatus of any of aspects 29-40, where the UE supports operation in a full-duplex mode at the network entity in accordance with obtaining the control signaling that indicates the first set of resources and the second set of resources that at least partially overlap in time, and the UE operates in a half-duplex mode in accordance with the prioritization.

Aspect 42: The apparatus of any of aspects 29-41, where the first set of resources at least partially overlapping in time with the second set of resources triggers a use of the prioritization.

Aspect 43: An apparatus for wireless communications at a network entity, including: one or more interfaces configured to: output control signaling that indicates a first set of resources associated with an uplink signal and a second set of resources associated with an SSB that corresponds to a non-serving cell of a UE, where the first set of resources at least partially overlaps in time with the second set of resources; and communicate with the UE in accordance with a prioritization of one of the uplink signal or the SSB.

Aspect 44: The apparatus of aspect 43, where, to output the control signaling, the one or more interfaces are further configured to: output an indication of a scheduling offset associated with the uplink signal, where the prioritization of the one of the uplink signal or the SSB is associated with a time duration of the scheduling offset.

Aspect 45: The apparatus of aspect 44, where, to communicate with the UE in accordance with the prioritization, the one or more interfaces are further configured to: obtain the uplink signal using the first set of resources in accordance with prioritizing the uplink signal over the SSB if the time duration of the scheduling offset satisfies a threshold time duration; and output the SSB using the second set of resources in accordance with prioritizing the SSB over the uplink signal if the time duration of the scheduling offset fails to satisfy the threshold time duration.

Aspect 46: The apparatus of any of aspects 44-45, where the time duration of the scheduling offset is associated with a priority of the uplink signal, and the time duration satisfying a threshold time duration indicates that the uplink signal is associated with a relatively higher priority than the SSB.

Aspect 47: The apparatus of any of aspects 43-46, where, to output the control signaling, the one or more interfaces are further configured to: output an indication of the second set of resources associated with the SSB, where the prioritization of the one of the uplink signal or the SSB is associated with a type of the indication.

Aspect 48: The apparatus of aspect 47, where, to communicate with the UE in accordance with the prioritization, the one or more interfaces are further configured to: obtain the uplink signal using the first set of resources in accordance with prioritizing the uplink signal over the SSB if the type of the indication is associated with an indicated TCI state or a neighbor cell SSB information element; and output the SSB using the second set of resources in accordance with prioritizing the SSB over the uplink signal if the type of the indication is associated with a measurement at the UE.

Aspect 49: The apparatus of any of aspects 43-48, where the one or more interfaces are further configured to: output information associated with the prioritization, where communicating with the UE in accordance with the prioritization is associated with outputting the information associated with the prioritization.

Aspect 50: The apparatus of any of aspects 43-49, where information associated with the prioritization is configured at the network entity in accordance with a network specification.

Aspect 51: The apparatus of any of aspects 43-50, where, to communicate with the UE in accordance with the prioritization, the one or more interfaces are further configured to: use a complete set of allocated resources for one of the uplink signal or the SSB that is associated with a relatively higher priority; and use a partial set of allocated resources for another of the uplink signal or the SSB that is associated with a relatively lower priority, where the partial set of allocated resources is non-overlapping with the complete set of allocated resources.

Aspect 52: The apparatus of any of aspects 43-50, where, to communicate with the UE in accordance with the prioritization, the one or more interfaces are further configured to: drop one of the uplink signal or the SSB that is associated with a relatively lower priority than another of the uplink signal or the SSB.

Aspect 53: The apparatus of any of aspects 43-50, where, to communicate with the UE in accordance with the prioritization, the one or more interfaces are further configured to: use a complete set of allocated resources for one of the uplink signal or the SSB that is associated with a relatively higher priority; and use a third set of resources for another of the uplink signal or the SSB that is associated with a relatively lower priority, where the third set of resources are non-overlapping with the complete set of allocated resources, and where the third set of resources is indicated by the network entity or a next available set of resources.

Aspect 54: The apparatus of any of aspects 43-53, where the network entity is associated with a first TRP associated with a serving cell for the UE and a second TRP associated with the non-serving cell, and the uplink signal is associated with the first TRP and the SSB is associated with the second TRP.

Aspect 55: The apparatus of any of aspects 43-54, where the network entity operates in a full-duplex mode in accordance with outputting the control signaling that indicates the first set of resources and the second set of resources that at least partially overlap in time, and the network entity supports operation in a half-duplex mode at the UE in accordance with the prioritization.

Aspect 56: The apparatus of any of aspects 43-55, where the first set of resources at least partially overlapping in time with the second set of resources triggers a use of the prioritization.

Aspect 57: An apparatus for wireless communications at a UE, including: means for receiving control signaling that indicates a first set of resources associated with an uplink signal and a second set of resources associated with an SSB that corresponds to a non-serving cell, where the first set of resources at least partially overlaps in time with the second set of resources; and means for communicating with a network entity in accordance with a prioritization of one of the uplink signal or the SSB.

Aspect 58: The apparatus of aspect 57, where the means for receiving the control signaling include: means for receiving an indication of a scheduling offset associated with the uplink signal, where the prioritization of the one of the uplink signal or the SSB is associated with a time duration of the scheduling offset.

Aspect 59: The apparatus of aspect 58, where the means for communicating with the network entity in accordance with the prioritization include: means for transmitting the uplink signal using the first set of resources in accordance with prioritizing the uplink signal over the SSB if the time duration of the scheduling offset satisfies a threshold time duration; and means for monitoring the second set of resources in accordance with prioritizing the SSB over the uplink signal if the time duration of the scheduling offset fails to satisfy the threshold time duration.

Aspect 60: The apparatus of any of aspects 58-59, where the time duration of the scheduling offset is associated with a priority of the uplink signal, and the time duration satisfying a threshold time duration indicates that the uplink signal is associated with a relatively higher priority than the SSB.

Aspect 61: The apparatus of any of aspects 57-60, where the means for receiving the control signaling include: means for receiving an indication of the second set of resources associated with the SSB, where the prioritization of the one of the uplink signal or the SSB is associated with a type of the indication.

Aspect 62: The apparatus of aspect 61, where the means for communicating with the network entity in accordance with the prioritization include: means for transmitting the uplink signal using the first set of resources in accordance with prioritizing the uplink signal over the SSB if the type of the indication is associated with an indicated TCI state or a neighbor cell SSB information element; and means for monitoring the second set of resources in accordance with prioritizing the SSB over the uplink signal if the type of the indication is associated with a measurement at the UE.

Aspect 63: The apparatus of any of aspects 57-62, further including: means for receiving information associated with the prioritization, where communicating with the network entity in accordance with the prioritization is associated with receiving the information associated with the prioritization.

Aspect 64: The apparatus of any of aspects 57-63, where information associated with the prioritization is configured at the UE in accordance with a network specification.

Aspect 65: The apparatus of any of aspects 57-64, where the means for communicating with the network entity in accordance with the prioritization include: means for using a complete set of allocated resources for one of the uplink signal or the SSB that is associated with a relatively higher priority; and means for using a partial set of allocated resources for another of the uplink signal or the SSB that is associated with a relatively lower priority, where the partial set of allocated resources is non-overlapping with the complete set of allocated resources.

Aspect 66: The apparatus of any of aspects 57-64, where the means for communicating with the network entity in accordance with the prioritization include: means for dropping one of the uplink signal or the SSB that is associated with a relatively lower priority than another of the uplink signal or the SSB.

Aspect 67: The apparatus of any of aspects 57-64, where the means for communicating with the network entity in accordance with the prioritization include: means for using a complete set of allocated resources for one of the uplink signal or the SSB that is associated with a relatively higher priority; and means for using a third set of resources for another of the uplink signal or the SSB that is associated with a relatively lower priority, where the third set of resources are non-overlapping with the complete set of allocated resources, and where the third set of resources is indicated by the network entity or a next available set of resources.

Aspect 68: The apparatus of any of aspects 57-67, where the network entity is associated with a first TRP associated with a serving cell for the UE and a second TRP associated with the non-serving cell, and the uplink signal is associated with the first TRP and the SSB is associated with the second TRP.

Aspect 69: The apparatus of any of aspects 57-68, where the UE supports operation in a full-duplex mode at the network entity in accordance with receiving the control signaling that indicates the first set of resources and the second set of resources that at least partially overlap in time, and the UE operates in a half-duplex mode in accordance with the prioritization.

Aspect 70: The apparatus of any of aspects 57-69, where the first set of resources at least partially overlapping in time with the second set of resources triggers a use of the prioritization.

Aspect 71: An apparatus for wireless communications at a network entity, including: means for transmitting control signaling that indicates a first set of resources associated with an uplink signal and a second set of resources associated with an SSB that correspond to a non-serving cell of a UE, where the first set of resources at least partially overlaps in time with the second set of resources; and means for communicating with the UE in accordance with a prioritization of one of the uplink signal or the SSB.

Aspect 72: The apparatus of aspect 71, where the means for transmitting the control signaling include: means for transmitting an indication of a scheduling offset associated with the uplink signal, where the prioritization of the one of the uplink signal or the SSB is associated with a time duration of the scheduling offset.

Aspect 73: The apparatus of aspect 72, where the means for communicating with the UE in accordance with the prioritization include: means for receiving the uplink signal using the first set of resources in accordance with prioritizing the uplink signal over the SSB if the time duration of the scheduling offset satisfies a threshold time duration; and means for transmitting the SSB using the second set of resources in accordance with prioritizing the SSB over the uplink signal if the time duration of the scheduling offset fails to satisfy the threshold time duration.

Aspect 74: The apparatus of any of aspects 72-73, where the time duration of the scheduling offset is associated with a priority of the uplink signal, and the time duration satisfying a threshold time duration indicates that the uplink signal is associated with a relatively higher priority than the SSB.

Aspect 75: The apparatus of any of aspects 71-74, where the means for transmitting the control signaling include: means for transmitting an indication of the second set of resources associated with the SSB, where the prioritization of the one of the uplink signal or the SSB is associated with a type of the indication.

Aspect 76: The apparatus of aspect 75, where the means for communicating with the UE in accordance with the prioritization include: means for receiving the uplink signal using the first set of resources in accordance with prioritizing the uplink signal over the SSB if the type of the indication is associated with an indicated TCI state or a neighbor cell SSB information element; and means for transmitting the SSB using the second set of resources in accordance with prioritizing the SSB over the uplink signal if the type of the indication is associated with a measurement at the UE.

Aspect 77: The apparatus of any of aspects 71-76, further including: means for transmitting information associated with the prioritization, where communicating with the UE in accordance with the prioritization is associated with transmitting the information associated with the prioritization.

Aspect 78: The apparatus of any of aspects 71-77, where information associated with the prioritization is configured at the network entity in accordance with a network specification.

Aspect 79: The apparatus of any of aspects 71-78, where the means for communicating with the UE in accordance with the prioritization include: means for using a complete set of allocated resources for one of the uplink signal or the SSB that is associated with a relatively higher priority; and means for using a partial set of allocated resources for another of the uplink signal or the SSB that is associated with a relatively lower priority, where the partial set of allocated resources is non-overlapping with the complete set of allocated resources.

Aspect 80: The apparatus of any of aspects 71-78, where the means for communicating with the UE in accordance with the prioritization include: means for dropping one of the uplink signal or the SSB that is associated with a relatively lower priority than another of the uplink signal or the SSB.

Aspect 81: The apparatus of any of aspects 71-78, where the means for communicating with the UE in accordance with the prioritization include: means for using a complete set of allocated resources for one of the uplink signal or the SSB that is associated with a relatively higher priority; and means for using a third set of resources for another of the uplink signal or the SSB that is associated with a relatively lower priority, where the third set of resources are non-overlapping with the complete set of allocated resources, and where the third set of resources is indicated by the network entity or a next available set of resources.

Aspect 82: The apparatus of any of aspects 71-81, where the network entity is associated with a first TRP associated with a serving cell for the UE and a second TRP associated with the non-serving cell, and the uplink signal is associated with the first TRP and the SSB is associated with the second TRP.

Aspect 83: The apparatus of any of aspects 71-82, where the network entity operates in a full-duplex mode in accordance with transmitting the control signaling that indicates the first set of resources and the second set of resources that at least partially overlap in time, and the network entity supports operation in a half-duplex mode at the UE in accordance with the prioritization.

Aspect 84: The apparatus of any of aspects 71-83, where the first set of resources at least partially overlapping in time with the second set of resources triggers a use of the prioritization.

Aspect 85: A non-transitory computer-readable medium storing code for wireless communications at a UE, the code including instructions executable by a processor to: receive control signaling that indicates a first set of resources associated with an uplink signal and a second set of resources associated with an SSB that corresponds to a non-serving cell, where the first set of resources at least partially overlaps in time with the second set of resources; and communicate with a network entity in accordance with a prioritization of one of the uplink signal or the SSB.

Aspect 86: The non-transitory computer-readable medium of aspect 85, where the instructions to receive the control signaling are executable by the processor to: receive an indication of a scheduling offset associated with the uplink signal, where the prioritization of the one of the uplink signal or the SSB is associated with a time duration of the scheduling offset.

Aspect 87: The non-transitory computer-readable medium of aspect 86, where the instructions to communicate with the network entity in accordance with the prioritization are executable by the processor to: transmit the uplink signal using the first set of resources in accordance with prioritizing the uplink signal over the SSB if the time duration of the scheduling offset satisfies a threshold time duration; and monitor the second set of resources in accordance with prioritizing the SSB over the uplink signal if the time duration of the scheduling offset fails to satisfy the threshold time duration.

Aspect 88: The non-transitory computer-readable medium of any of aspects 86-87, where the time duration of the scheduling offset is associated with a priority of the uplink signal, and the time duration satisfying a threshold time duration indicates that the uplink signal is associated with a relatively higher priority than the SSB.

Aspect 89: The non-transitory computer-readable medium of any of aspects where the instructions to receive the control signaling are executable by the processor to: receive an indication of the second set of resources associated with the SSB, where the prioritization of the one of the uplink signal or the SSB is associated with a type of the indication.

Aspect 90: The non-transitory computer-readable medium of aspect 89, where the instructions to communicate with the network entity in accordance with the prioritization are executable by the processor to: transmit the uplink signal using the first set of resources in accordance with prioritizing the uplink signal over the SSB if the type of the indication is associated with an indicated TCI state or a neighbor cell SSB information element; and monitor the second set of resources in accordance with prioritizing the SSB over the uplink signal if the type of the indication is associated with a measurement at the UE.

Aspect 91: The non-transitory computer-readable medium of any of aspects where the instructions are further executable by the processor to: receive information associated with the prioritization, where communicating with the network entity in accordance with the prioritization is associated with receiving the information associated with the prioritization.

Aspect 92: The non-transitory computer-readable medium of any of aspects where information associated with the prioritization is configured at the UE in accordance with a network specification.

Aspect 93: The non-transitory computer-readable medium of any of aspects where the instructions to communicate with the network entity in accordance with the prioritization are executable by the processor to: used a complete set of allocated resources for one of the uplink signal or the SSB that is associated with a relatively higher priority; and used a partial set of allocated resources for another of the uplink signal or the SSB that is associated with a relatively lower priority, where the partial set of allocated resources is non-overlapping with the complete set of allocated resources.

Aspect 94: The non-transitory computer-readable medium of any of aspects where the instructions to communicate with the network entity in accordance with the prioritization are executable by the processor to: drop one of the uplink signal or the SSB that is associated with a relatively lower priority than another of the uplink signal or the SSB.

Aspect 95: The non-transitory computer-readable medium of any of aspects where the instructions to communicate with the network entity in accordance with the prioritization are executable by the processor to: used a complete set of allocated resources for one of the uplink signal or the SSB that is associated with a relatively higher priority; and used a third set of resources for another of the uplink signal or the SSB that is associated with a relatively lower priority, where the third set of resources are non-overlapping with the complete set of allocated resources, and where the third set of resources is indicated by the network entity or a next available set of resources.

Aspect 96: The non-transitory computer-readable medium of any of aspects where the network entity is associated with a first TRP associated with a serving cell for the UE and a second TRP associated with the non-serving cell, and the uplink signal is associated with the first TRP and the SSB is associated with the second TRP.

Aspect 97: The non-transitory computer-readable medium of any of aspects where the UE supports operation in a full-duplex mode at the network entity in accordance with receiving the control signaling that indicates the first set of resources and the second set of resources that at least partially overlap in time, and the UE operates in a half-duplex mode in accordance with the prioritization.

Aspect 98: The non-transitory computer-readable medium of any of aspects where the first set of resources at least partially overlapping in time with the second set of resources triggers a use of the prioritization.

Aspect 99: A non-transitory computer-readable medium storing code for wireless communications at a network entity, the code including instructions executable by a processor to: transmit control signaling that indicates a first set of resources associated with an uplink signal and a second set of resources associated with an SSB that correspond to a non-serving cell of a UE, where the first set of resources at least partially overlaps in time with the second set of resources; and communicate with the UE in accordance with a prioritization of one of the uplink signal or the SSB.

Aspect 100: The non-transitory computer-readable medium of aspect 99, where the instructions to transmit the control signaling are executable by the processor to: transmit an indication of a scheduling offset associated with the uplink signal, where the prioritization of the one of the uplink signal or the SSB is associated with a time duration of the scheduling offset.

Aspect 101: The non-transitory computer-readable medium of aspect 100, where the instructions to communicate with the UE in accordance with the prioritization are executable by the processor to: receive the uplink signal using the first set of resources in accordance with prioritizing the uplink signal over the SSB if the time duration of the scheduling offset satisfies a threshold time duration; and transmit the SSB using the second set of resources in accordance with prioritizing the SSB over the uplink signal if the time duration of the scheduling offset fails to satisfy the threshold time duration.

Aspect 102: The non-transitory computer-readable medium of any of aspects 100-101, where the time duration of the scheduling offset is associated with a priority of the uplink signal, and the time duration satisfying a threshold time duration indicates that the uplink signal is associated with a relatively higher priority than the SSB.

Aspect 103: The non-transitory computer-readable medium of any of aspects 99-102, where the instructions to transmit the control signaling are executable by the processor to: transmit an indication of the second set of resources associated with the SSB, where the prioritization of the one of the uplink signal or the SSB is associated with a type of the indication.

Aspect 104: The non-transitory computer-readable medium of aspect 103, where the instructions to communicate with the UE in accordance with the prioritization are executable by the processor to: receive the uplink signal using the first set of resources in accordance with prioritizing the uplink signal over the SSB if the type of the indication is associated with an indicated TCI state or a neighbor cell SSB information element; and transmit the SSB using the second set of resources in accordance with prioritizing the SSB over the uplink signal if the type of indication is associated with a measurement at the UE.

Aspect 105: The non-transitory computer-readable medium of any of aspects 99-104, where the instructions are further executable by the processor to: transmit information associated with the prioritization, where communicating with the UE in accordance with the prioritization is associated with transmitting the information associated with the prioritization.

Aspect 106: The non-transitory computer-readable medium of any of aspects 99-105, where information associated with the prioritization is configured at the network entity in accordance with a network specification.

Aspect 107: The non-transitory computer-readable medium of any of aspects 99-106, where the instructions to communicate with the UE in accordance with the prioritization are executable by the processor to: used a complete set of allocated resources for one of the uplink signal or the SSB that is associated with a relatively higher priority; and used a partial set of allocated resources for another of the uplink signal or the SSB that is associated with a relatively lower priority, where the partial set of allocated resources is non-overlapping with the complete set of allocated resources.

Aspect 108: The non-transitory computer-readable medium of any of aspects 99-106, where the instructions to communicate with the UE in accordance with the prioritization are executable by the processor to: drop one of the uplink signal or the SSB that is associated with a relatively lower priority than another of the uplink signal or the SSB.

Aspect 109: The non-transitory computer-readable medium of any of aspects 99-106, where the instructions to communicate with the UE in accordance with the prioritization are executable by the processor to: used a complete set of allocated resources for one of the uplink signal or the SSB that is associated with a relatively higher priority; and used a third set of resources for another of the uplink signal or the SSB that is associated with a relatively lower priority, where the third set of resources are non-overlapping with the complete set of allocated resources, and where the third set of resources is indicated by the network entity or a next available set of resources.

Aspect 110: The non-transitory computer-readable medium of any of aspects 99-109, where the network entity is associated with a first TRP associated with a serving cell for the UE and a second TRP associated with the non-serving cell, and the uplink signal is associated with the first TRP and the SSB is associated with the second TRP.

Aspect 111: The non-transitory computer-readable medium of any of aspects 99-110, where the network entity operates in a full-duplex mode in accordance with transmitting the control signaling that indicates the first set of resources and the second set of resources that at least partially overlap in time, and the network entity supports operation in a half-duplex mode at the UE in accordance with the prioritization.

Aspect 112: The non-transitory computer-readable medium of any of aspects 99-111, where the first set of resources at least partially overlapping in time with the second set of resources triggers a use of the prioritization.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A user equipment (UE), comprising:
a processing system that includes processor circuitry and memory circuitry that stores code, the processing system configured to cause the UE to:
obtain control signaling that indicates a first set of resources associated with an uplink signal and a second set of resources associated with a synchronization signal block (SSB) that corresponds to a non-serving cell, wherein the first set of resources at least partially overlaps in time with the second set of resources; and
communicate with a network entity in accordance with a prioritization of one of the uplink signal or the SSB,
wherein the UE supports operation in a full-duplex mode at the network entity in accordance with obtaining the control signaling that indicates the first set of resources and the second set of resources that at least partially overlap in time, and
wherein the UE operates in a half-duplex mode in accordance with the prioritization.

2. The UE of claim 1, wherein, to obtain the control signaling, the processing system is configured to cause the UE to:
obtain an indication of a scheduling offset associated with the uplink signal, wherein the prioritization of the one of the uplink signal or the SSB is associated with a time duration of the scheduling offset.

3. The UE of claim 2, wherein, to communicate with the network entity in accordance with the prioritization, the processing system is configured to cause the UE to:

output the uplink signal using the first set of resources in accordance with prioritizing the uplink signal over the SSB if the time duration of the scheduling offset satisfies a threshold time duration; and monitor the second set of resources in accordance with prioritizing the SSB over the uplink signal if the time duration of the scheduling offset fails to satisfy the threshold time duration.

4. The UE of claim 2, wherein the time duration of the scheduling offset is associated with a priority of the uplink signal, and wherein the time duration satisfying a threshold time duration indicates that the uplink signal is associated with a relatively higher priority than the SSB.

5. The UE of claim 1, wherein, to obtain the control signaling, the processing system is configured to cause the UE to:

obtain an indication of the second set of resources associated with the SSB, wherein the prioritization of the one of the uplink signal or the SSB is associated with a type of the indication.

6. The UE of claim 5, wherein, to communicate with the network entity in accordance with the prioritization, the processing system is configured to cause the UE to:

output the uplink signal using the first set of resources in accordance with prioritizing the uplink signal over the SSB if the type of the indication is associated with an indicated transmission configuration indicator (TCI) state or a neighbor cell SSB information element; and monitor the second set of resources in accordance with prioritizing the SSB over the uplink signal if the type of the indication is associated with a measurement at the UE.

7. The UE of claim 1, wherein the processing system is further configured to cause the UE to:

obtain information associated with the prioritization, wherein communicating with the network entity in accordance with the prioritization is associated with obtaining the information associated with the prioritization.

8. The UE of claim 1, wherein information associated with the prioritization is configured at the UE in accordance with a network specification.

9. The UE of claim 1, wherein, to communicate with the network entity in accordance with the prioritization, the processing system is configured to cause the UE to:

use a complete set of allocated resources for one of the uplink signal or the SSB that is associated with a relatively higher priority; and use a partial set of allocated resources for another of the uplink signal or the SSB that is associated with a relatively lower priority, wherein the partial set of allocated resources is non-overlapping with the complete set of allocated resources.

10. The UE of claim 1, wherein, to communicate with the network entity in accordance with the prioritization, the processing system is configured to cause the UE to:

drop one of the uplink signal or the SSB that is associated with a relatively lower priority than another of the uplink signal or the SSB.

11. The UE of claim 1, wherein, to communicate with the network entity in accordance with the prioritization, the processing system is configured to cause the UE to:

use a complete set of allocated resources for one of the uplink signal or the SSB that is associated with a relatively higher priority; and use a third set of resources for another of the uplink signal or the SSB that is associated with a relatively lower priority, wherein the third set of resources are non-overlapping with the complete set of allocated resources, and wherein the third set of resources is indicated by the network entity or a next available set of resources.

12. The UE of claim 1, wherein the network entity is associated with a first transmission and reception point (TRP) associated with a serving cell for the UE and a second TRP associated with the non-serving cell, and wherein the uplink signal is associated with the first TRP and the SSB is associated with the second TRP.

13. A method for wireless communications at a user equipment (UE), comprising:

receiving control signaling that indicates a first set of resources associated with an uplink signal and a second set of resources associated with a synchronization signal block (SSB) that corresponds to a non-serving cell, wherein the first set of resources at least partially overlaps in time with the second set of resources; and communicating with a network entity in accordance with a prioritization of one of the uplink signal or the SSB, wherein communicating with the network entity in accordance with the prioritization is associated with receiving information associated with the prioritization.

14. The method of claim 13, wherein receiving the control signaling comprises:

receiving an indication of a scheduling offset associated with the uplink signal, wherein the prioritization of the one of the uplink signal or the SSB is associated with a time duration of the scheduling offset.

15. The method of claim 14, wherein communicating with the network entity in accordance with the prioritization comprises:

transmitting the uplink signal using the first set of resources in accordance with prioritizing the uplink signal over the SSB if the time duration of the scheduling offset satisfies a threshold time duration; and monitoring the second set of resources in accordance with prioritizing the SSB over the uplink signal if the time duration of the scheduling offset fails to satisfy the threshold time duration.

16. The method of claim 13, wherein the network entity is associated with a first transmission and reception point (TRP) associated with a serving cell for the UE and a second TRP associated with the non-serving cell, and wherein the uplink signal is associated with the first TRP and the SSB is associated with the second TRP.

17. The method of claim 13, wherein the UE supports operation in a full-duplex mode at the network entity in accordance with obtaining the control signaling that indicates the first set of resources and the second set of resources that at least partially overlap in time, and wherein the UE operates in a half-duplex mode in accordance with the prioritization.

18. A method for wireless communications at a user equipment (UE), comprising:

receiving control signaling that indicates a first set of resources associated with an uplink signal and a second set of resources associated with a synchronization signal block (SSB) that corresponds to a non-serving cell, wherein the first set of resources at least partially overlaps in time with the second set of resources;

receiving an indication of the second set of resources associated with the SSB; and communicating with a network entity in accordance with a prioritization of one of the uplink signal or the SSB, wherein the prioritization of the one of the uplink signal or the SSB is associated with a type of the indication.

19. The method of claim 18, wherein communicating with the network entity in accordance with the prioritization comprises:

transmitting the uplink signal using the first set of resources in accordance with prioritizing the uplink signal over the SSB if the type of the indication is associated with an indicated transmission configuration indicator (TCI) state or a neighbor cell SSB information element; and monitoring the second set of resources in accordance with prioritizing the SSB over the uplink signal if the type of the indication is associated with a measurement at the UE.

* * * * *